(12) United States Patent
Namie

(10) Patent No.: US 10,353,354 B2
(45) Date of Patent: Jul. 16, 2019

(54) MODEL PREDICTIVE CONTROL DEVICE, CONTROL METHOD OF MODEL PREDICTIVE CONTROL DEVICE, INFORMATION PROCESSING PROGRAM AND RECORDING MEDIUM

(71) Applicant: OMRON Corporation, Kyoto (JP)

(72) Inventor: Masaki Namie, Takatsuki (JP)

(73) Assignee: OMRON Corporation, Kyoto (JP)

( * ) Notice: Subject to any disclaimer, the term of this patent is extended or adjusted under 35 U.S.C. 154(b) by 6 days.

(21) Appl. No.: 15/439,914

(22) Filed: Feb. 22, 2017

(65) Prior Publication Data

US 2018/0067460 A1     Mar. 8, 2018

(30) Foreign Application Priority Data

Sep. 5, 2016   (JP) ................................ 2016-172851

(51) Int. Cl.
    *G05B 13/02*     (2006.01)
    *G05B 13/04*     (2006.01)

(52) U.S. Cl.
    CPC ................. *G05B 13/048* (2013.01)

(58) Field of Classification Search
    USPC .......................................................... 700/29
    See application file for complete search history.

(56) References Cited

U.S. PATENT DOCUMENTS

| | | | | |
|---|---|---|---|---|
| 7,418,372 | B2* | 8/2008 | Nishira | B60K 31/047 |
| | | | | 700/44 |
| 2010/0082120 | A1* | 4/2010 | Stephenson | G05B 13/048 |
| | | | | 700/29 |
| 2015/0346704 | A1* | 12/2015 | Tabaru | G06F 17/11 |
| | | | | 700/29 |
| 2016/0041536 | A1 | 2/2016 | Benosman et al. | |
| 2016/0048119 | A1* | 2/2016 | Wojsznis | G05B 19/0423 |
| | | | | 700/11 |
| 2016/0170384 | A1* | 6/2016 | Charest-Finn | G05B 13/048 |
| | | | | 700/44 |

(Continued)

FOREIGN PATENT DOCUMENTS

| | | |
|---|---|---|
| JP | 2004-348481 | 12/2004 |
| JP | 2006268566 | 10/2006 |
| JP | 2009193192 | 8/2009 |

OTHER PUBLICATIONS

"Search Report of Europe Counterpart Application", dated Jan. 5, 2018, p. 1-p. 11, in which the listed references were cited.

(Continued)

*Primary Examiner* — Mohammad Ali
*Assistant Examiner* — Md Azad
(74) *Attorney, Agent, or Firm* — JCIPRNET

(57) ABSTRACT

The present invention simplifies the processing for compensating an influence for a controlled quantity generated from shaping interference in motion control. A controller (10) as a model predictive control device computes an error between an actually measured value of a controlled quantity in a certain action cycle when shaping interfering is applied and a predictive value of the controlled quantity in the certain action cycle, i.e., the model predictive error, and corrects the predictive value in the action cycle after the certain action cycle by using the computed model predictive error.

9 Claims, 12 Drawing Sheets

(56) References Cited

U.S. PATENT DOCUMENTS

2016/0357169 A1\* 12/2016 Di Cairano .......... G05B 19/106
2017/0235285 A1\* 8/2017 Azuma ................ G05B 13/048
                                                              700/29

OTHER PUBLICATIONS

"Office Action of Europe Counterpart Application", dated Nov. 5, 2018, p. 1-p. 9.
"Office Action of Europe Counterpart Application", dated Apr. 24, 2019, p. 1-p. 7.

\* cited by examiner

MODEL PREDICTIVE CONTROL DEVICE, CONTROL METHOD OF MODEL PREDICTIVE CONTROL DEVICE, INFORMATION PROCESSING PROGRAM AND RECORDING MEDIUM

CROSS-REFERENCE TO RELATED APPLICATION

This application claims the priority benefit of Japanese application serial no. 2016-172851, filed on Sep. 5, 2016. The entirety of the above-mentioned patent application is hereby incorporated by reference herein and made a part of this specification.

BACKGROUND OF THE INVENTION

1. Field of the Invention

The present invention relates to a model predictive control device and so on using a model of a controlled object as a motion controlled object to predict a controlled quantity.

2. Description of Related Art

In the past, for example, there is a known interference (shaping interference) generated in a shaping manner in execution of motion control by a contact force change and so on between a tool and a work in a cycle (action cycle), and an influence of the shaping interference on a controlled quantity is tried to be inhibited.

For example, the following patent document 1 records a process control device, which controls a process based on an operating quantity output from an adjusting part for control, and such process control device infers an interference graph applied to this process based a difference between the operating quantity output from the adjusting part for control during process execution and the operating quantity solved by taking the controlled quantity when the process is to be executed as a target value.

EXISTING TECHNICAL DOCUMENTS

Patent Document

Patent document 1: JP patent publication No. 2004-348481 (published on 9 Dec. 2004)

SUMMARY OF THE INVENTION

Problem to be Solved

However, in the convention technologies as mentioned above, the operation for inferring the size of a shaping interference and applying timing (generation) according to a level of the operating quantity must be independent from the operation for control, as a result, there is a problem of large operation load.

The present invention is finished in view of the problem, and aims to provide a control device, which simplifies the processing of compensating the influence of the interference with the same size and applying timing on the controlled quantity in motion control.

Means for Solving the Problem

In order to solve the problem, a model predictive control device in one form of the present invention uses a model of a controlled object as a motion controlled object to predict a controlled quantity of the controlled object corresponding to a command value and the model predictive control device is characterized by comprising an error computing part, computing a model predictive error, wherein the model predictive error is an error between an actually measured value of the controlled quantity in a certain action cycle when an interference with the same size and applying timing is applied among continuous multiple action cycles and a controlled quantity predictive value using the model in the certain action cycle; and a predictive value correcting part, correcting the predictive value in the action cycle after the certain action cycles by using the model predictive error in the certain action cycle computed by the error computing part.

According to the structure, the predictive value correcting part corrects the predictive value in the action cycle after the certain action cycles by using the model predictive error in the certain action cycle. That is, the model predictive control device can perform interference compensation without inferring the operating quantity equivalent to the interference.

Therefore, the model predictive control device achieves the following effect of being capable of compensating the interference without a need to execute an operation processing of converting the change of the controlled quantity caused by the interference into the operating quantity, thereby simplifying the processing of compensating the change of the controlled quantity caused by the interference.

Preferably, in the model predictive control device, the predictive value correcting part corrects the predictive value in the action cycle of times after a predetermined time by using the model predictive error in the action cycle of the predetermined time computed by the error computing part.

According to the structure, the predictive value correcting part corrects the predictive value in the action cycle of times after a predetermined time by using the model predictive error in the action cycle of the predetermined time.

Herein, n is set into a natural number and is known in advance that the model predictive error in the nth action cycle is used to correct the predictive value of the times after the (n+1) time, then a user can prepare a surrounding with a high reproducibility for the motion control in the nth action cycle in advance. That is, the model predictive control device can obtain the model predictive error suitable for correcting the predictive value in the action cycle of times after the (n+1) time in the nth action cycle.

Therefore, the model predictive control device achieves the following effect of correcting the predictive value in the action cycle of times after the predetermined time by using the high-precision model predictive error in the action cycle of the predetermined time without including the error generated by accident.

Therefore, the model predictive control device achieves the following effect of prestoring the model predictive error in the surrounding with the high reproducibility at the last of an adjusting stage prior to the present operation and correcting the predictive value during the present operation by using the stored model predictive error.

Preferably, in the model predictive control device, the predictive value correcting part corrects the predictive value in the action cycle next to a certain action cycle by using the model predictive error in the certain action cycle computed by the error computing part.

Effects

According to the structure, the predictive value correcting part corrects the predictive value in the action cycle next to a certain action cycle by using the model predictive error in the certain action cycle Herein, when the error computing part computes the model predictive error in the certain action cycle, it can be considered that a possibility that the same model predictive error occurs in the action cycle next to the certain action cycle is high.

Therefore, the model predictive control device achieves the following effects of computing that the possibility of the model predictive error similar to that computed in the certain action cycle is high and correcting the predictive value in the action cycle next to the certain action cycle by using the model predictive error in the certain action cycle.

Preferably, the model predictive control device further comprises: a torque computing part, computing a torque required by the predictive value corrected by the predictive value correcting part to follow the command value; and a torque command part, outputting the torque computed by the torque computing part as a command value related to torque control of the controlled object to a control system performing motion control over the controlled object.

According to the structure, the torque computing part computes a torque required by the predictive value corrected by the predictive value correcting part to follow the command value; and the torque command part outputs the torque computed by the torque computing part as a command value related to torque control of the controlled object to the control system.

Therefore, the model predictive control device achieves the following effect of being capable of outputting the torque causing the controlled quantity of the controlled object to follow the command value to the control system without a need to execute an operation processing of converting a change of the controlled quantity caused by the interference into an operating quantity.

Preferably, the model predictive control device further comprises a command value correcting part, correcting the command value such that the predictive value corrected by the predictive value correcting part follows the command value; and a position command part, outputting the command value corrected by the command value correcting part, i.e., a corrected command value as a command value related to position control of the controlled object to the control system performing motion control over the controlled object.

According to the structure, the command value correcting part corrects the command value in a manner that the predictive value corrected by the predictive value correcting part follows the command value; and the position command part outputs the command value corrected by the command value correcting part, i.e., a corrected command value as a command value related to position control of the controlled object to the control system performing motion control over the controlled object.

Therefore, the model predictive control device achieves the following effect of being capable of outputting the command value corrected in a manner that the controlled quantity of the controlled object follows the command value to the control system without a need to execute an operation processing of converting the change of the controlled quantity caused by the interference into the operating quantity.

Preferably, the model predictive control device further comprises: an accepting part, accepting user operation, wherein the user operation is to select for setting the model predictive error used by the predictive value correcting part to be the model predictive error in which action cycle.

According to the structure, the accepting part accepts the user operation, wherein the user operation is to select for setting the model predictive error used by the predictive value correcting part to be the model predictive error in which action cycle.

Therefore, the model predictive control device achieves the following effect of correcting the predictive value in the action cycle after the action cycle corresponding to the user operation by using the model predictive error in the action cycle corresponding to the user operation accepted by the accepting part.

Herein, the user operation can also be the operation designating a first action cycle. Besides, during the correcting of the action cycle after the second time, the user operation can also be the operation of designating to use the model predictive error in the preceding action cycle. Further, the model predictive control device can also correct the predictive value in the action cycle of the times (for example, fourth, fifth . . . , nth) after a designated random time by using the model predictive error in the action cycle of the random time (for example third) designated in the user operation.

Preferably, the model predictive control device further comprises a display control part, displaying a time change of the model predictive error to a user.

According to the structure, the display control part displays a time change of the model predictive error to the user.

Therefore, the model predictive control device achieves the following effect that since the time change of the model predictive error is displayed to the user, the user can approximately master an interference form according to a waveform occurring in the time change (so-called trend graph) of the model predictive error displayed by the model predictive control device.

In order to solve the above problem, a control method in one form of the present invention is a control method of a model predictive control device, the model predictive control device uses a model of a controlled object as a motion controlled object to predict a controlled quantity of the controlled object corresponding to a command value and the control method is characterized by comprising an error computing step, computing a model predictive error, wherein the model predictive error is an error between an actually measured value of the controlled quantity in a certain action cycle when an interference with the same size and applying tuning is applied among continuous multiple action cycles and a controlled quantity predictive value using the model in the certain action cycle; and a predictive value correcting step, correcting the predictive error in the action cycle after the certain action cycles by using the model predictive error in the certain action cycle computed by the error computing step.

According to the method, the predictive value correcting step corrects the predictive error in the action cycle after the certain action cycles by using the model predictive error in the certain action cycle. That is, the control method of the model predictive control device can perform interference compensation without inferring the operating quantity equivalent to the interference.

Therefore, the control method of the model predictive control device achieves the following effect of being capable of compensating the interference without a need to execute an operation processing of converting the change of the controlled quantity caused by the interference into the operating quantity, thereby simplifying the processing of compensating the change of the controlled quantity caused by the interference.

Effects of the Invention

The present invention achieves the following effect of simplifying the processing of compensating the influence of the interference with the same size and applying timing on the controlled quantity in motion control.

DESCRIPTION OF THE EMBODIMENTS

Embodiment 1

Figure 1:
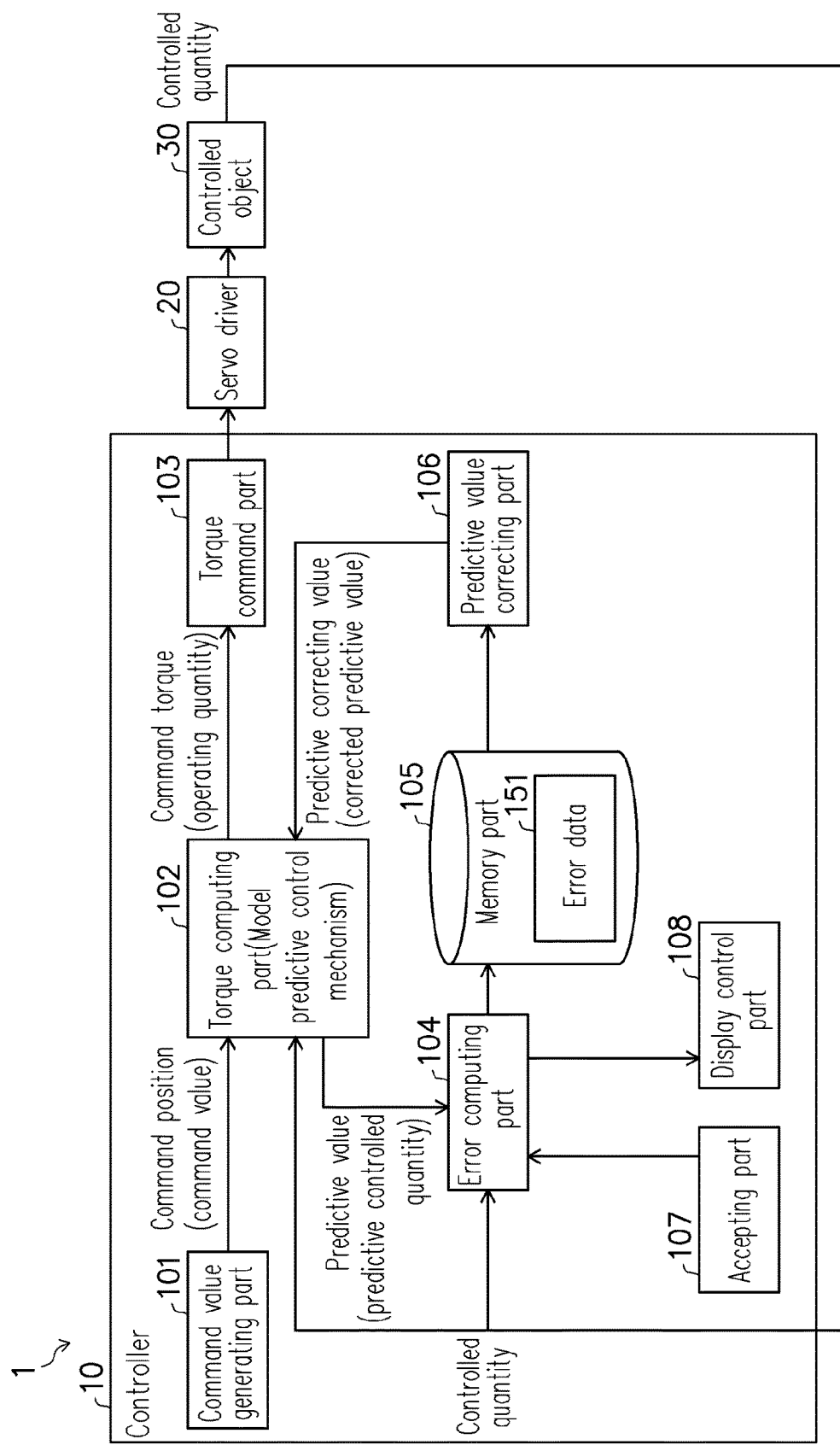
FIG. 1 is a block diagram illustrating a main part structure of a controller of an embodiment 1 of the present invention.
Figure 2:
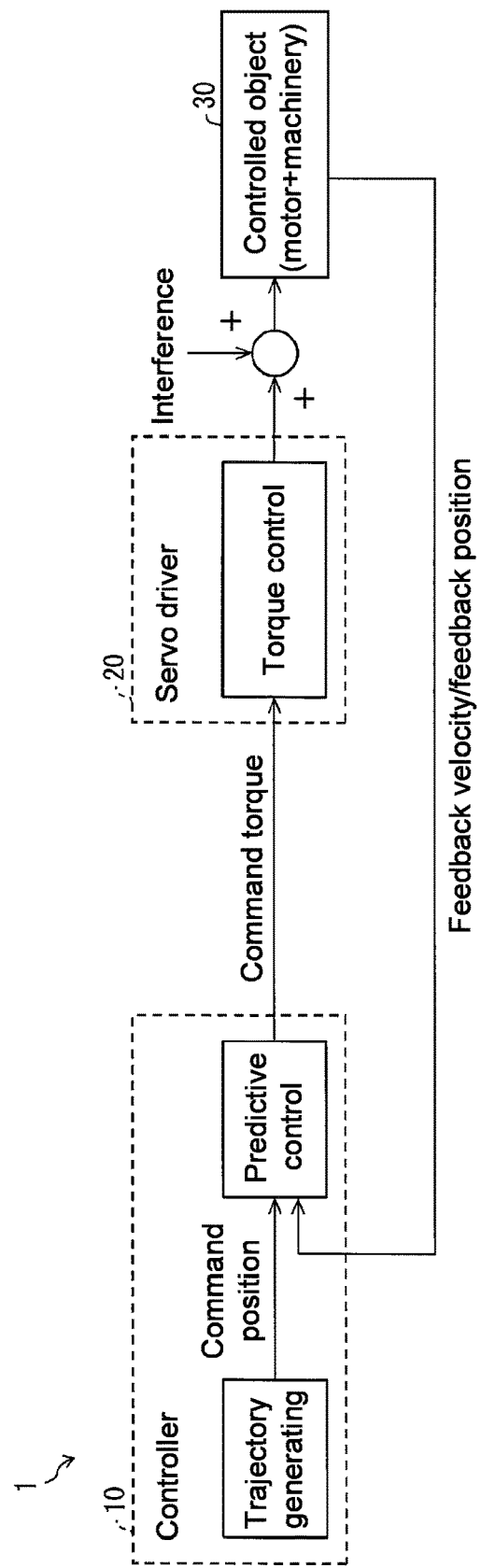
FIG. 2 is a diagram illustrating a summary of a control system containing the controller in FIG. 1.

Embodiment 1 of the present invention is explained in detail based on FIGS. 1-10. The same or equivalent parts are labelled with the same sign and are not explained repeatedly. In order to facilitating understanding on a controller 10 (model predictive control device) in one form of the present invention, at first, FIG. 2 is used to explain a summary of a control system 1 containing the controller 10.

(Summary of the Control System)

FIG. 2 is a diagram illustrating a summary of a control system 1 containing the controller 10. The control system 1 is required to inhibit an influence of the interference, i.e., "shaping interference" with the same generating (applying) timing and size in a cycle (one action cycle) on a control performance. Particularly, the controller 10 is required to simplify the processing of compensating the influence for the controlled quantity generated from the shaping interference (interference compensation processing).

The controller 10 for example prestores a predictive error of one cycle (model predictive error) in a control manner having a predictive mechanism such as a Model Predictive Control (MPC), and corrects the prediction after the next cycle by using the stored predictive error of one cycle. The controller 10 is suitable for motion control, for example, for inhibiting an influence of a change of a contact force between a work and a cutter (tool) for a position accuracy in one cycle in processing machinery. The controller 10 can maintain the control performance even there is the shaping interference, and thus can maintain a quality of a manufactured object.

In addition, the shaping interference having an influence on the control performance that the controller 10 can inhibit is not only the interference with the same applying timing and size in one cycle but also contains the interference with the approximately same applying timing and size in one cycle.

The control system 1 contains (1) the controller 10, for example, being a Programmable Logic Controller (PLC); (2) a servo driver 20 as a lower controller controlled by the controller 10 as the upper controller; and (3) a controlled object 30 (for example motor or machinery), controlled by the servo driver 20. In the control system 1, the controller 10 executes position/velocity control, and outputs a torque command value to the servo driver 20 by prediction control.

The controller 10 is a controller having a model predictive control mechanism, and outputs a torque command value as an operating quantity to the servo driver 20. The controller 10 for example accepts target trajectory data (target trajectory) (trajectory generation) from outside such as a user, and generates a command value (command position) in each control cycle according to the accepted target trajectory data. Besides, the controller 10 obtains output of the controlled object 30, i.e., the controlled quantity (an actually measured value of the controlled quantity) from the controlled object 30 as feedback information. That is, the controller 10 obtains a velocity and position (at least one of the velocity and position) output from the controlled object 30 as a feedback velocity and a feedback position (at least one of the feedback velocity and the feedback position).

The controller 10 has a model of the controlled object 30 (and the servo driver 20) as an internal model, and by using the internal model, based on the generated command position and the output of the controlled object 30, i.e., the controlled quantity, the torque command value as the operating quantity is output to the servo driver 20. Herein, the controller 10 uses the model of the controlled object (i.e., the controlled object 30 and the servo driver 20) to predict the controlled quantity, and infers the predictive error for interference compensation. That is, the controller 10 "infers" the predictive error at a current moment by using a reference predictive error stored in the past (i.e., prestored). Herein, the so-called "infers" can be understood of reading the predictive error at such moment by matching a moment in the cycle.

The controller 10 directly stores and uses an interference pattern with a dimensionality of the controlled quantity, and therefore, the operation for inferring interference expect for the operation for computing the controlled quantity does not need to be prepared separately (but, to be more specifically, what is stored in the controller 10 is not "interference pattern" and is a predictive error pattern containing interference information). Therefore, the controller 10 is small in operation load compared with a device which also performs the operation for inferring interference except for the operation for computing the controlled quantity, which becomes an important merit in motion control requiring a high velocity control cycle.

The servo driver 20 executes torque control over the controlled object 30 according to the torque command value from the controller 10.

(Summary of the Controller)

As so far, FIG. 2 is used to explain the controller 10 contained in the control system 1, and then the structure and processed content are explained with FIG. 1. Before detailed content is explained by referring to FIG. 1, the summary is cleared up as follows to conveniently understand the controller 10.

The controller 10 is a model predictive control device, uses a model of a controlled object 30 (and the servo driver 20) as a motion controlled object to predict a controlled quantity of the controlled object 30 corresponding to a command value and comprises an error computing part 104: computing a model predictive error, wherein the model predictive error is an error between an actually measured value of the controlled quantity in a certain action cycle when an interference with the same (approximately same) size and applying timing is applied among continuous multiple action cycles and a controlled quantity predictive value using the model in the certain action cycle; and a predictive value correcting part 106, correcting the predictive error in the action cycle after the certain action cycles by using the model predictive error in the certain action cycle computed by the error computing part 104.

According to the structure, the predictive value correcting part 106 corrects the predictive error in the action cycle after the certain action cycles by using the model predictive error in the certain action cycle. That is, the controller 10 can perform interference compensation without inferring the operating quantity equivalent to the interference.

Therefore, the controller 10 achieves the following effect of being capable of compensating the interference without a need to execute an operation processing of converting the change of the controlled quantity caused by the interference into the operating quantity, thereby simplifying the processing of compensating the change of the controlled quantity caused by the interference.

The controller 10 further comprises: a torque computing part 102, computing a torque required by the predictive value corrected by the predictive value correcting part 106 to follow the command value; and a torque command part 103, outputting the torque computed by the torque computing part 102 as a command value related to torque control of the controlled object 30 to the servo driver 20 (a control system performing motion control over the controlled object 30).

According to the structure, the torque computing part 102 computes a torque required by the predictive value corrected by the predictive value correcting part 106 to follow the command value; and the torque command part 103 outputs the torque computed by the torque computing part 102 as a command value related to torque control of the controlled object 30 to the servo driver 20.

Therefore, the controller 10 achieves the following effect of being capable of outputting the torque causing the controlled quantity of the controlled object 30 to follow the command value to the servo driver 20 without a need to execute an operation processing of converting a change of the controlled quantity caused by the interference into an operating quantity.

(Details of the Controller)

The controller 10 measures and stores the interference generated in "certain cycle" all over the cycle of the "certain cycle", and corrects the predictive value of the cycle after the "certain cycle" by using the stored interference measured all over the whole of the "certain cycle". For the controller 10 of which the summary is explained, details of its structure are explained by using FIG. 1.

FIG. 1 is a block diagram illustrating a main part structure of the controller 10 of the embodiment 1 of the present invention. The controller 10 as shown in FIG. 1 structurally has a command generating part 101, a torque computing part 102, a torque command part 103, an error computing part 104, a memory part 105, a predictive value correcting part 106, an accepting part 107 and a display control part 108. In addition, in order to ensure compactness of recording, structures not directly related to the present embodiment are omitted in the explanation and block diagram. But, according to an actual implementing condition, the controller 10 can also have the omitted structures. Respective function blocks of the command value generating part 101, the torque computing part 102, the torque command part 103, the error computing part 104, the predictive value correcting part 106, the accepting part 107 and the display control part 108 and the like for example can be realized through a following manner: that is, a program stored in the memory device (memory part 105) implemented as a Read Only Memory (ROM) and a Non-Volatile Random Access Memory (NVRAM) and the like is read out by a Central Processing Unit (CPU) to a Random Access Memory (RAM) not shown for execution. Hereinafter, each function block in the controller 10 is explained.

The command value generating part 101 accepts target trajectory data (target trajectory) from outside (for example a user) (trajectory generation), and generates a command value in each control cycle according to the accepted target trajectory data. The command value generating part 101 sends the generated command value (command position) to the torque computing part 102.

The torque computing part 102 executes Model Predictive Control (MPC). Specifically, an internal model of the controlled object (that is, the controlled object 30 and the servo driver 20) is used to predict a future state to decide (infer) the controlled quantity in a manner that the future output of the controlled object 30 (predictive value of the controlled quantity) is approached to a target value (command value, i.e., the command position) as much as possible. That is, the torque computing part 102 predicts a future output change based on the internal model and decides input (operating quantity) in a manner of approaching to the target value as much as possible.

The torque computing part 102 contains the internal model for modelling actions of the controlled object (that is, the controlled object 30 and the servo driver 20), and uses the internal model to predict a controlled quantity output by the controlled object 30 in each control cycle. That is, the torque computing part 102 uses the internal model to compute the predictive value in each control cycle (predictive value of the controlled quantity). The torque computing part 102 notifies the error computing part 104 of the computed predictive value (predictive controlled quantity).

Besides, the torque computing part 102 uses the internal model to compute the torque required by the predictive corrected value (corrected predictive value) obtained from the predictive value correcting part 106, that is, the predictive value (predictive value of the controlled quantity) corrected by the predictive value correcting part 106 to follow the command value (command position). The torque computing part 102 uses the computed torque as the command torque (operating quantity) and notifies the torque command part 103.

The torque command part 103 uses the command torque (operating quantity) notified from the torque computing part 102 as a command value related to the torque control of the controlled object 30 and outputs to the servo driver 20 (control system performing motion control over the controlled object 30).

The computing part 104 computes the model predictive error, which is an error between the output (actually measured value of the controlled quantity) of the controlled object 30 in a certain action cycle when an interference with the same (approximately same) size and applying timing between continuous multiple action cycles and the controlled quantity predictive value (predictive controlled quantity) in the certain action cycle. That is, the computing part 104 calculates an error (model predictive error in the certain control cycle) between "the predictive value (predictive controlled quantity) of the controlled quantity in certain control cycle" notified from the torque computing part 102 and "the output (actually measured value of the controlled quantity) of the controlled object 30 in the certain control cycle".

Herein, the error computing part 104 can also obtain the action cycle designated (selected) in the user operation accepted by the accepting part 107, that is, the action cycle designated by the user. Besides, the error computing part 104 can also compute the model predictive error in the action cycle designated by the user according to the output (actually measured value of the controlled quantity) of the controlled object 30 in the action cycle designated by the user and the predictive value of the controlled quantity (predictive controlled quantity) in the action cycle designated by the user.

The computing part 104 stores the computed "model predictive error in the certain action cycle" into the memory part 105 as error data 151. Besides, the computing part 104 notifies the display control part 109 of the computed "model predictive error in the certain action cycle".

The memory part 105 is a memory device storing various data used by the controller 10. In addition, the memory part 105 can also non-temporarily store (1) a control program, (2) an Operating System (OS) program, (3) application programs for executing various function that the controller 10 has and (4) various data read when the application programs are executed, which are executed by the controller 10. The data of (1)-(4) for example are stored in a Read Only Memory (ROM), a flash memory, an Erasable Programmable ROM (EPROM), an Electrically EPROM (EEPROM) (registered trademark), a Hard Disk Drive (HDD) and other nonvalatile memory devices.

The controller 10 can also have a temporary memory part not shown. The temporary memory part is the so-called working memory, including a volatile memory device such as a Random Access Memory (RAM) temporarily storing data for operation and an operation result in various processing processes executed by the controller 10.

The operation that which data are stored in which memory device is properly decided according to a user purpose, convenience, cost, physical limitation or the like of the controller 10. The memory part 105 further stores the error data 151.

The error data 151 are information of the "model predictive error in certain control cycle" computed by the computing part 104, and are stored to the memory part 105 by the computing part 104.

The predictive value correcting part 106 corrects the predictive value (predictive value of the controlled quantity, that is, predictive controlled quantity) in the action cycle after the "certain action cycle" computed by the torque computing part 102 by using the "model predictive error in the certain action cycle" obtained by referring to the error data 151 stored in the memory part 105.

The predictive value correcting part 106 obtains the action cycle designated (selected) in the user operation accepted by the accepting part 107 from the accepting part 107, i.e., the action cycle designated by the user. Besides, the predictive value correcting part 106 obtains the model predictive error in the action cycle designated by the user by referring to the error data 151. The predictive value correcting part 106 corrects the predictive value (predictive value of the controlled quantity, i.e., the predictive controlled quantity) in the action cycle after the "action cycle designated by the user" computed by the torque computing part 102 by using the "model predictive error in the action cycle designated by the user".

Besides, the predictive value correcting part 106 notifies the torque computing part 102 of the corrected predictive value (predictive value of the controlled quantity, that is, predictive controlled quantity) in the action cycle after the "certain action cycle", that is, the predictive correcting value (corrected predictive value) in the action cycle after the "certain action cycle".

That is, the predictive value correcting part 106 corrects the predictive value (predictive value of the controlled quantity, that is, the predictive controlled quantity) in the action cycle after the "certain action cycle" by using the model predictive error in the "certain action cycle". It can also be understood in a manner that the predictive value correcting part 106 infers the model predictive error in the action cycle after the "certain action cycle" according to the model predictive error in the "certain action cycle".

The accepting part 107 accepts user operation, and the user operation is selection of setting the model predictive error used by the predictive value correcting part 106 into the model predictive model in which action cycle. The accepting part 107 notifies the predictive value correcting part 106 of the action cycle designated (selected) in the user operation, that is, the action cycle designated by the user.

Herein, the user operation accepted by the accepting part 107 can also be the operation of indicating the predictive value correcting part 106 to correct the predictive value (predictive value of the controlled quantity, that is, the predictive controlled quantity) in the action cycle "after the second time" by using the model predictive error in the for example "first time" action cycle. Besides, the user operation can also be the operation of designating the predictive value correcting part 106 to use the model predictive error in the preceding action cycle when the predictive value in the action cycle after the second time is corrected. Further, the controller 10 can also correct the predictive value in the action cycle of times (for example, fourth, fifth . . . , nth) after a designated random time by using the model predictive error in the action cycle of the random time (for example third) designated in the user operation.

Further, the accepting part 107 can also accept the user operation as mentioned below, the user operation is the selection of setting the output (actually measured value of the controlled quantity) of the controlled object 30 and the predictive value of the controlled quantity (predictive controlled quantity) in the "certain action cycle" used when the error computing part 104 computes the model predictive error in the "certain action cycle" into which action cycle. The accepting part 107 notifies the error computing part 104 of the action cycle designated (selected) in the user operation, that is, the action cycle designated by the user.

The display control part 108 displays the time change of the model predictive error to the user. The display control part 108 for example can also obtain the model predictive error in the "certain control cycle" computed by the computing part 104 from the computing part 104 and displays the time change of the model predictive error to the user by using the obtained model predictive error. Besides, the display control part 108 can also display the time change of the model predictive error to the user by retelling to the error data 151 stored in the memory part 105.

(Regarding Model Predictive Control)

Figure 3:
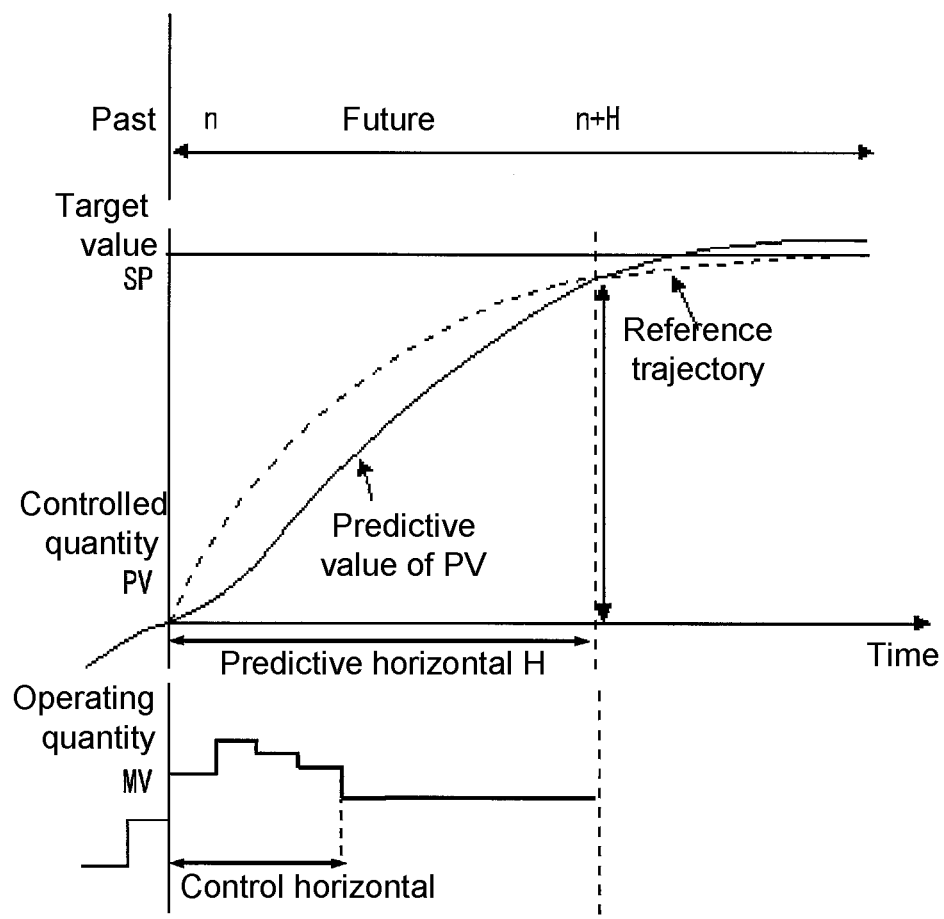
FIG. 3 is a diagram for explaining a summary of model predictive control executed by the controller in FIG. 1.

FIG. 3 is a diagram for illustrating model predictive control executed by the controller 10. The model predictive control decides (infers) a future operating quantity (the torque command value given to the servo driver 20 in the control system 1) for causing the controlled quantity to be consistent with a target point on a reference trajectory (the target trajectory in the control system 1) by using a model of the controlled object (the controlled object 30 (and the servo driver 20) in the control system 1), and repeatedly executes such processing in each cycle. In addition, the reference trajectory is a trajectory hypothetically set in the controller 10 and is different from the target trajectory in the control system 1. A target value SP in FIG. 3 corresponds to the target trajectory in control system 1 (but, in FIG. 3, the target value SP is set into a fixed value).

The controller 10, as shown in FIG. 3, measures a controlled quantity PV(n) at a current moment n and computes the reference trajectory gradually approached to a target value SP by taking the controlled quantity PV(n) at the current moment as a start point and shown by a dotted line. Herein, in order for simplicity, control horizontal Hu is set into "1".

Next, the controller 10 uses an internal model (the model of the controlled object 30 (and the servo driver 20)) to decide an operating quantity MV (n) at a current moment n in a manner that a predictive value PV(n+H) of the controlled quantity PV after a predictive horizontal H is consistent with the reference trajectory.

The controller 10 actually adds an obtained operating quantity MV(n) to the servo driver 20 and keeps this value till the next sampling moment n+1.

When the controlled quantity PV(n+1) is determined at the moment n+1, the controller 10 considers the moment t+1 as the current moment and decides (infers) the operating quantity in a manner that a future predictive value is consistent with the reference trajectory after the predictive horizontal H till the next sampling moment. The following, this process is performed repeatedly.

Next, the predictive control executed by the controller 10 in the control system 1 is explained in detail.

The controller 10 performs predictive control by using the internal model as mentioned above, and in the control system 1, the internal model adopts an N times Auto Regressive eXogenous (ARX) model expressed in a discretization manner of sampling time. In addition, the model of the controlled object (the controlled object 30 (and the servo driver 20) in the control system 1) is not limited to an ARX model and a step response model or other models can also be used.

$$Y(n)=-a1 \times Y(n-1)-a2 \times Y(n-2)-\ldots-aN \times Y(n-N)+b1 \times U(n-1)+b2 \times U(n-2)+\ldots+bM \times U(n-M)$$

Herein,

Y(n): internal model output value at moment n
U(n): operating quantity at moment n
a1-aN, b1-bM: coefficient of internal model
N, M: internal model times The ARX model is decided in a manner for example of previously measuring a time sequence data of input and output of the controlled object (the controlled object 30 (and the servo driver 20) in the control system 1), that is, a time sequence data of an operating quantity MV and a controlled quantity PV and using a least square method and so on.

In the control method 1, the reference trajectory as shown by the dotted line in FIG. 3 uses a trajectory causing a deviation at the current moment n to approach to 0 at a time constant Tr in a manner of exponential function.

That is, the target value R (n+H) on the reference trajectory after the predictive horizontal H can be solved by the following formula.

$$R(n+H)=SP(n+H)-\lambda H \times \{SP(n)-PV(n)\},$$

$$\lambda=\exp(-Tc/Tr)$$

Herein,

PV(n): controlled quantity at moment n
SP(n), SP(n+H): target values at moments n and n+H
R(n+H): target value on the reference trajectory before predictive horizontal H
Tc: sampling time Therefore, an increment computed from the controlled quantity PV(n) at the current moment n, that is, the increment (deviation) ΔP(n+H) of the controlled quantity PV required for causing the controlled quantity PV to be consistent with the target value R(n+H) on the reference trajectory after predictive horizontal H is turned into:

$$\Delta P(n+H) = SP(n+H) - \lambda H \times \{SP(n) - PV(n)\} - PV(n)$$
$$= (1-\lambda H)\{SP(n) - PV(n)\} + SP(n+H) - SP(n)$$

Next, computing of the operating quantity MV is explained.

Under the condition of a linear controlled object, a model output action is solved by two addition operations as follows.

(1) Free Response

The current state is used as an initial value, according to the formula of the ARX model, the model output Yf(n+H) lasting to be 0 as a future operating quantity MV and after predictive horizontal H is solved through repeated computing.

$$Yf(n+1) = -a1 \times Y(n) - a2 \times Y(n-1) - \ldots - aN \times Y(n-N+1)$$
$$Yf(n+2) = -a1 \times Yf(n+1) - a2 \times Y(n) - \ldots - aN \times Y(n-N+2)$$
$$\ldots$$
$$Yf(n+H) = \frac{-a1 \times Yf(n+H-1) - a2 \times Yf(n+H-2) - \ldots}{-aN \times Y(n-N+H)}$$

(2) Step Response

The initial state is set to be 0 to solve the model output S(H) in the step respose of MV=1(100%) and the moment H $$S(1) = b1$$
$$S(2) = -a1 \times S(1) + (b1+b2)$$
$$\ldots$$
$$S(H) = \frac{-a1 \times S(H-1) - a2 \times S(H-2) - \ldots -}{aN \times S(H-N) + (b1+b2+\ldots+bM)}$$

If MV is not 1(100%) and is set into MV(n) generally, then the step response output at the moment H is turned into MV(n)×S(H).

Herein, MV(n): operating quantity at moment n

Yf(n+H): free response output of the model after predictive horizontal H

S(H): step response output of the model at moment H

According to the former item, when the operating quantity MV(n) is lasted after the moment n, the model output (predictive value of the controlled quantity) at a time point of the moment n+H is the following formula.

$$Y(n+H)=Yf(n+H)+MV(n)\times S(H)$$

Herein, the increment computed from Y(n), that is, the increment ΔM(n+H) of the expected model output after predictive horizontal H is turned into $$\Delta M(n+H)=Yf(n+H)+MV(n)\times S(H)-Y(n).$$

Therefore, only the operating quantity MV can be solved in a manner that the increment ΔM(n+H) of the expected model output after the predictive horizontal H is equal to the increment ΔP(n+H) of the controlled quantity PV for causing the controlled quantity PV to be turned into the target value on the reference trajectory after the predictive horizontal H. That is, only the operating quantity MV of ΔM(n+H)=ΔP(n+H) needs to be solved.

Herein, if a correcting quantity CH (n) is considered herein, then according to ΔM(n+H)+CH(n)=ΔP(n+H), $$Yf(n+H)+MV(n)\times S(H)-Y(n)+CH(n)=(1-\lambda H)\{SP(n)-PV(n)\}+SP(n+H)-SP(n)$$

If MV(n) is solved, then $$MV(n)=[(1-\lambda H)\{SP(n)-PV(n)\}+SP(n+H)-SP(n)-Yf(n+H)+Y(n)-CH(n)]/S(H)$$

When the internal model does not contain stagnant time, a computing formula of MV of the former item is corrected into the stagnant time d.

Therefore, for actual process data, the moment n+d is replaced with moment n.

$$MV(n)=[(1-\lambda H)\{SP(n+d)-PV(n+d)\}+SP(n+H+d)-SP(n+d)-Yf(n+H)+Y(n)-CH(n)]/S(H)$$

Herein, a required predictive value of PV(n+d) as reasonable similarity is generally solved by the following computing formula.

$$PV(n+d)=PV(n)+Y(n)-Y(n-d)$$

Herein, if the predictive correcting quantity Cd(n) of the stagnant time d is also considered, then according to $$PV(n+d)=PV(n)+Y(n)-Y(n-d)+Cd(n)$$

$$MV(n)=[(1-\lambda H)\{SP(n+d)-PV(n)+Y(n)-Y(n-d)+Cd(n)\}+SP(n+H+d)-SP(n+d)-Yf(n+H)+Y(n)-CH(n)]/S(H)$$

In addition, after the operating quantity MV (n) at the moment n is computed, in order for next computing, the next model output Y(n+1) is solved in advance.

$$Y(n+1)=a1\times Y(n)+a2\times Y(n-1)+\ldots +aN\times Y(n-N+1)+b1\times MV(n)+b2\times MV(n-1)+\ldots +bM\times MV(n-M+1)$$

Wherein MV(n) is a value processed by using the operating quantity.

(One Example of Interference Compensation Processing)

Figure 4:
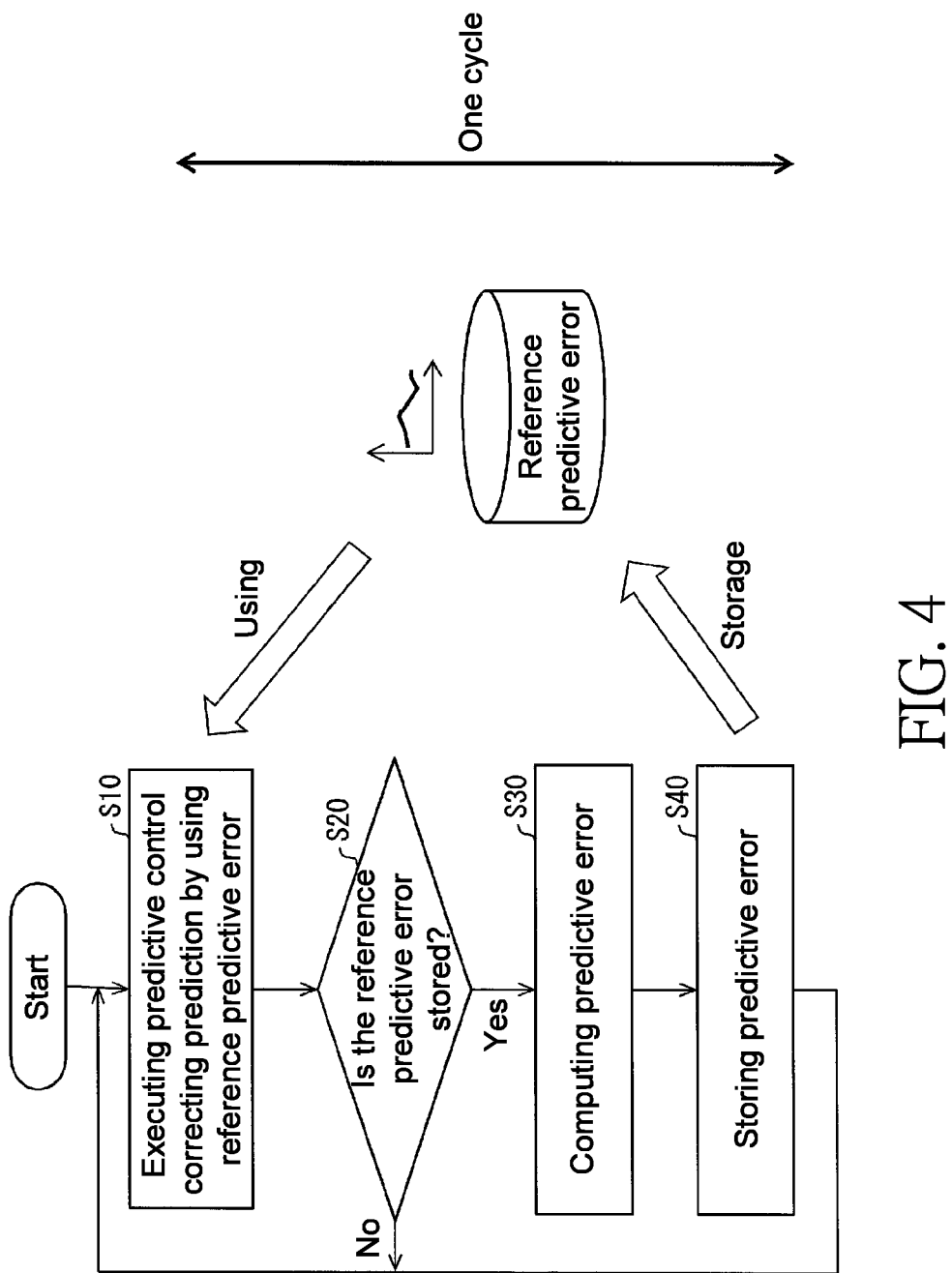
FIG. 4 is a flow chart of an example of interference compensation processing executed by the controller in FIG. 1.

FIG. 4 is a flow chart of an example of interference compensation processing executed by the controller 10. As shown in FIG. 4, the controller 10 (torque computing part 102) executes predictive control in the nth cycle (n is natural number equal to or more than 1) of motion control (S10), and if required, the error computing part 104 computes predictive error data of one cycle (S30), and stores the computed model predictive error as error data 151 into the memory part 105 (S40). In addition, the data stored as the error data 151 are called as "reference predictive error" and are explained in detail as follows.

The controller 10 corrects the predictive value of the model predictive control (the predictive value of the controlled quantity computed by the torque computing part 102) by using the reference predictive error in the "control cycle after the (n+1)th cycle". That is, the predictive value correcting part 106 uses the model predictive error (reference predictive error) of the nth cycle stored as the error data 151 to correct the predictive controlled quantity after the (n+1)th cycle (the "predictive value in the action cycle after the (n+1)th cycle (predictive value of the controlled quantity)" computed by the torque computing part 102). Besides, the torque computing part 102 uses the internal model to compute a torque required by the predictive value (predictive value of the controlled quantity) corrected by the predictive value correcting part 106 to follow a command value (command position). The torque command part 103 outputs the torque computed by the torque computing part 102 as the command torque (operating quantity) to the servo driver 20 (S10, execution of the predictive control).

In addition, during the first control execution (control execution when "n=1"), since the reference predictive error is not stored into the memory part 105, there is no error data 151, the predictive value cannot be corrected in fact even through the interference compensation processing is executed.

The controller 10 judges whether a new reference predictive error is stored (S20). That is, the accepting part 107 judges whether the user operation indicating to store the new reference predictive error is accepted. In addition, when the accepting part 107 accepts the user operation indicating to use the model predictive error in the preceding action cycle during correcting of the predictive value in the action cycle after the second time, the accepting part 107 also judges that "the user operation indicating to store the new reference predictive error is accepted".

When the accepting part 107 judges that "the user operation indicating to store the new reference predictive error is accepted", that is, the new preference predictive error is stored (Yes in S20), the error computing part 104 computes the new reference predictive error (model predictive error) (S30) and stores the computed new reference predictive error as the error data 151 into the memory part 105 (S40).

That is, the error computing part 104 computes the model predictive error in the action cycle designates by the user operation and stores the computed model predictive error as error data 151 into the memory part 105. For example, the torque computing part 102 executes the predictive control of "nth cycle" and the error computing part 104 computes the model predictive error in the "nth cycle" according to the actually measured value of the controlled quantity of the controlled object 30 in the "nth cycle" and the predictive controlled quantity in the "nth cycle". The error computing part 104 stores the computed model predictive error (new reference predictive error) in the "nth cycle" as the error data 151 into the memory part 105.

Besides, the predictive value correcting part 106 uses the new reference predictive error stored in the memory part 15 as the error data 151 to correct the predictive value (predictive value of the controlled quantity, that is, predictive controlled quantity) (generating predictive correcting value (corrected predictive value)). The torque computing part 102 uses the internal model to compute the torque (command torque) required by the predictive correcting value (corrected predictive value) to follow the command value (command position), and the torque command part 103 outputs the command torque (operating quantity) computed by the torque computing part 102 into the servo driver 20 (execution of predictive control, S10).

When the accepting part 107 judges that "the user operation indicating to store the new reference predictive error is not accepted", that is, when the new reference predictive error is not stored (No in S20), the storage of the new reference predictive error by the error computing part 104 is not performed. The predictive value correcting part 106 uses the reference predictive error stored in the memory part 105 as the error data 151 to generate a predictive correcting value, and the torque computing part 102 computes the torque required by the predictive correcting value to follow the command value (command torque). The torque command part 103 outputs the command torque computed by the torque computing part 102 to the servo driver 20 (execution of predictive control, S10).

The interference compensation processing as shown in FIG. 4 is the interference compensation processing that the controller 10 only stores the reference predictive error when in need (in the example as mentioned above, the "predictive error data of one cycle in the nth cycle of motion control" is stored in the memory part 105 as error data 151). That is, the interference compensation processing as shown in FIG. 4 is the interference compensation processing of restoring the reference predictive error as required under the condition of changing a command pattern and under a condition of changing a loading condition.

The processing (control method) executed by the controller 10 explained by referring to FIG. 4 is cleared up as follows. That is, the processing (control method) executed by the controller 10 is a control method of a model predictive control device, the model predictive control device uses a model of a controlled object 30 as a motion controlled object to predict a controlled quantity of the controlled object 30 corresponding to a command value and the processing (control method) is characterized by comprising an error computing step (S30): computing a model predictive error, wherein the model predictive error is an error between an actually measured value of the controlled quantity in a certain action cycle when an interference with the same (approximately same) size and applying timing is applied among continuous multiple action cycles and a controlled quantity predictive value using the model in the certain action cycle; and a predictive value correcting step (S10), correcting the predictive error in the action cycle after the certain action cycles by using the model predictive error in the certain action cycle computed by the error computing step.

According to the method, the predictive value correcting step corrects the predictive error in the action cycle after the certain action cycles by using the model predictive error in the certain action cycle. That is, the control method of the controller 10 can perform interference compensation without inferring the operating quantity equivalent to the interference.

Therefore, the control method of the controller 10 achieves the following effect of being capable of compensating the interference without a need to execute an operation processing of converting the change of the controlled quantity caused by the interference into the operating quantity, thereby simplifying the processing of compensating the change of the controlled quantity caused by the interference.

(Correcting Method of Predictive Value)

Figure 5:
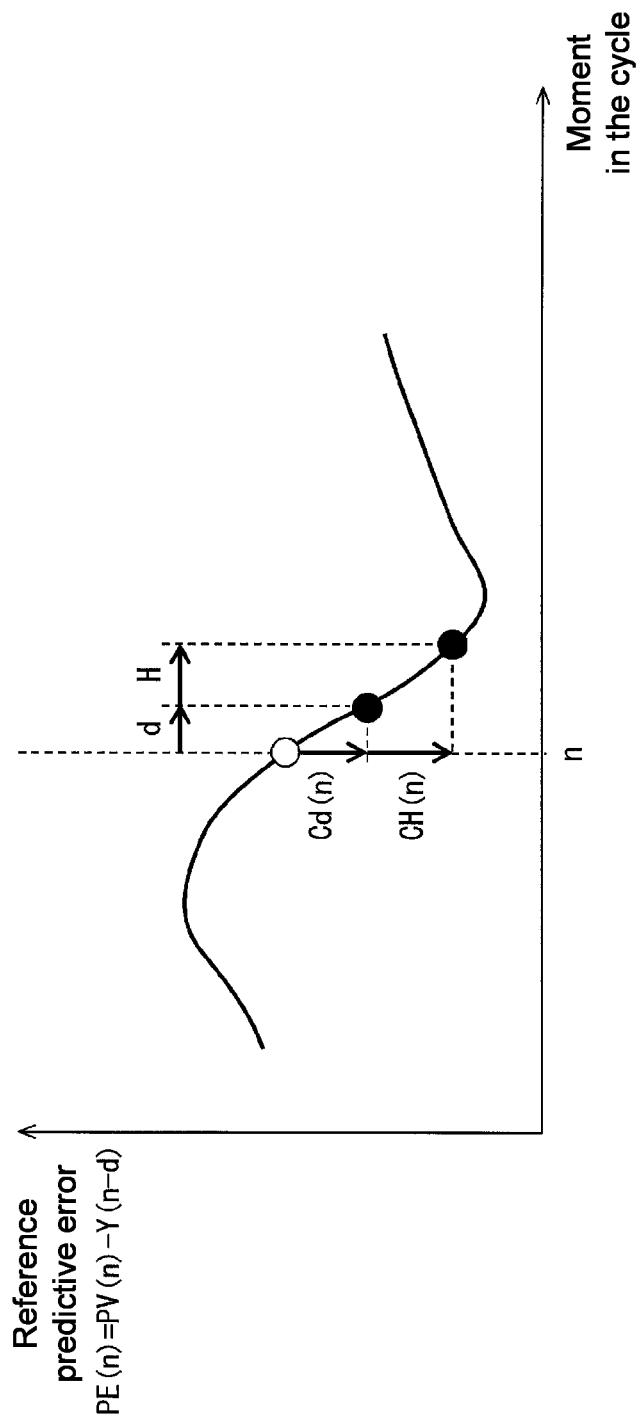
FIG. 5 is a diagram illustrating a method for correcting a predictive value by the controller in FIG. 1.

FIG. 5 is a diagram illustrating a method that the predictive value correcting part 106 of the controller 10 corrects the predictive value ("predictive value (predictive value of the controlled quantity, that is, predictive controlled quantity) in certain action cycle" computed by the torque computing part 102).

The predictive value correcting part 106 solves the predictive correcting quantities $Cd(n)$ and $CH(n)$ in an algorithm of the model predictive control explained in FIG. 3, so as to correct the predictive value (predictive value of the controlled quantity, i.e., predictive controlled quantity) in the action cycle after the "certain action cycle" computed by the torque computing part 102. Details are explained as follows.

In addition, in the following explanation, "$PE(n)$" is "the predictive error at the moment n", and "$PV(n)$" is the controlled quantity (the actually measured value of the controlled quantity output from the controlled object 30, for example feedback position) at the moment n. Besides, "$Y(n-d)$" is the model predictive value at the moment $(n-d)$ (the torque computing part 102 uses the predictive value of the controlled quantity at the moment $(n-d)$ computed by using the internal model modelling the actions of the controlled object (that is, the controlled object 30 and the servo driver 20)), "d" is "stagnant time". The stagnant time d is integer times of the control cycle of the controller 10.

The predictive value correcting part 106 solves the predictive error PE of the preference predictive error data at the moments "n", "n+d" and "n+d+H" in the cycle, and computes the predictive correcting quantities $Cd(n)$ and $CH(n)$ through the following formula $$Cd(n)=PE(n+d)-PE(n),$$

$$CH(n)=PE(n+d+H)-PE(n+d)$$

In addition, the error computing part computes the model predictive error $PE(n)$ through the following formula, and stores the computed model predictive error $PE(n)$ as error data 151 into the memory part 105.

$$PE(n)=PV(n)-Y(n-d)$$

(Timing Designating of Reference Predictive Error Storage)

The controller 10 has an accepting part 107, accepting user operation, wherein the user operation is to select for setting the model predictive error used by the predictive value correcting part 106 to be the model predictive error in which action cycle.

According to the structure, the accepting part 107 accepts the user operation, wherein the user operation is to select for setting the model predictive error used by the predictive value correcting part 106 to be the model predictive error in which action cycle.

Therefore, the controller 10 achieves the following effect of correcting the predictive value in the action cycle after the action cycle corresponding to the user operation by using the model predictive error in the action cycle corresponding to the user operation accepted by the accepting part 107.

Herein, the user operation can also be the operation designating a first action cycle. Besides, during the correcting of the action cycle after the second time, the user operation can also be designated use of the operation of the model predictive error in the preceding action cycle. Further, the controller 10 can also correct the predictive value in the action cycle of the times (for example, fourth, fifth . . . , nth) after a designated random time by using the model predictive error in the action cycle of the random time (for example third) designated in the user operation.

The accepting part 107 for example accept the user operation designated as follows, that is, only stores the model predictive error of the primary cycle (first action cycle), and always uses the model predictive error of the "primary cycle" during correcting of the predictive value in the action cycle after the second time.

Similarly, the accepting part 107 for example also accepts the user operation indicated as follows, that is, newly stores the model predictive error of the "nth (for example, fifth) action cycle" and uses the model predictive error in the nth action cycle during correcting of the predictive value in the action cycle after the (n+1) time (for example, sixth).

Further, the accepting part 107 can also accept the user operation indicated as follows, that is, stores the model predictive error in each action cycle, and corrects the predictive value in the action cycle next to the certain action cycle by using the model predictive error in the certain action cycle.

(Verification of Interference Compensation Effect)

As mentioned above, the accepting part 107 accepts user operation, and the user operation is selection of setting the model predictive error used by the predictive value correcting part 106 into the model predictive model in which action cycle. Besides, the predictive value correcting part 106 uses the model predictive error in "the action cycle designate in the user operation (action cycle designated by the user) accepted by the accepting part 107" to correct (interference compensation) the predictive value (predictive value of the controlled quantity, i.e., predictive controlled quantity) in the action cycle after "the action cycle designated by the user".

The following content explains that according to interference content, for example, according to the fact that the applied interference is unchanged or changed, the predictive value correcting part 106 uses the model predictive error in which moment (which action cycle) to correct the predictive value (predictive controlled quantity) to realize a better effect.

(Compensation of Unchanged Interference)

Figure 6:
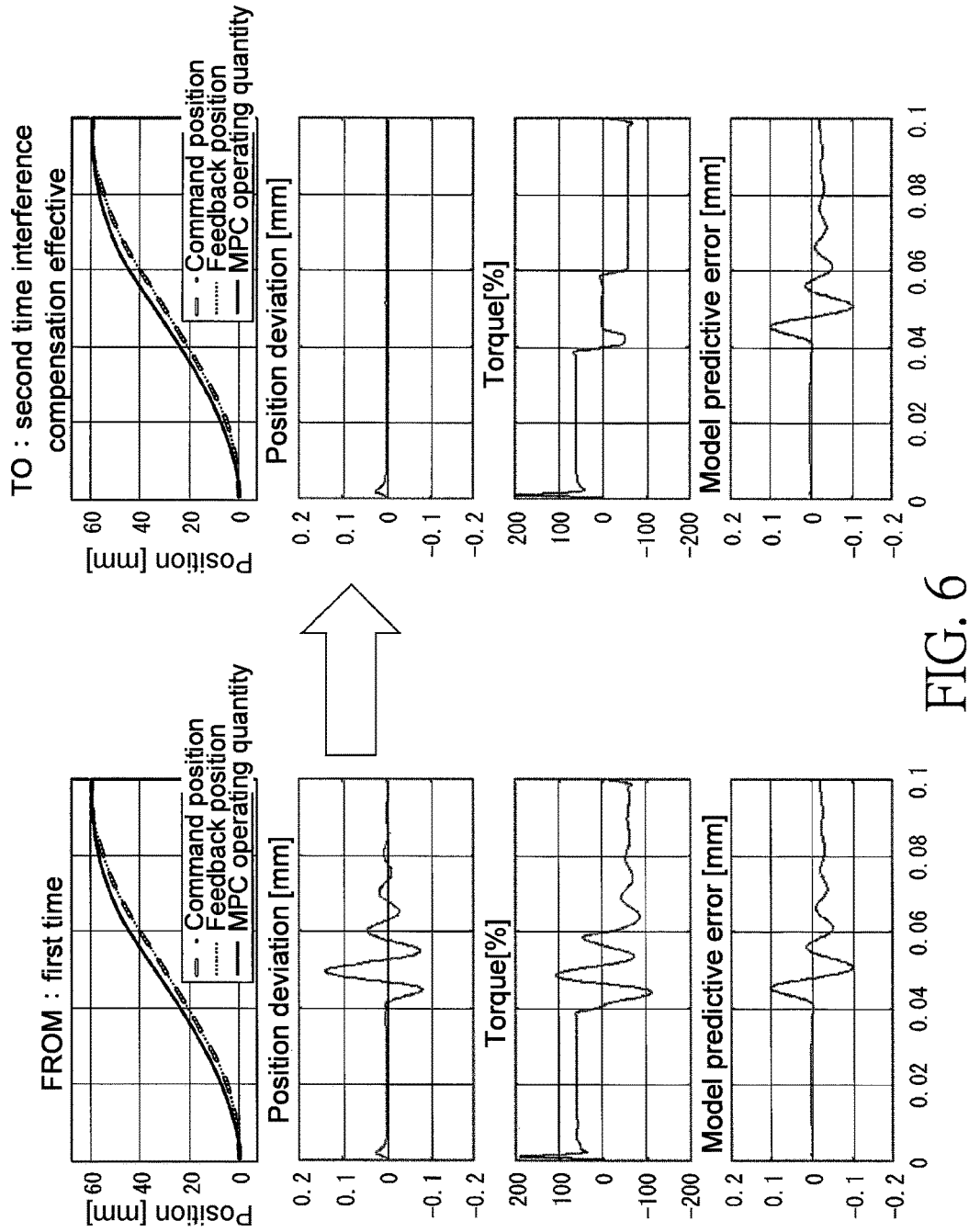
FIG. 6 is a diagram for illustrating an effect that the controller in FIG. 1 executes interference compensation processing.

FIG. 6 is a diagram used for illustrating an effect when the controller 10 executes interference compensation processing. That is, the example as shown in FIG. 6 illustrates a diagram used for explaining an effect that under a condition of "applying the pulse torque interference with a pulse width of 4 ms and an amplitude of 50% at the moment 40 ms" specific to the control over target trajectory data (target trajectory) of "moving by 60 mm for 100 ms (one cycle)", the controller 10 executes interference compensation processing.

In the example as shown in FIG. 6, the controller 10 corrects the predictive value in the action cycle after the second time by using the reference predictive error stored at the first time specific to the shaping interference (the interference whose size and applied timing is not changed throughout the multiple action cycles) like the "pulse torque interference with a pulse width of 4 ms and an amplitude of 50% at the moment 40 ms". That is, for shaping interference, the predictive value correcting part 106 uses the "model predictive error in the first action cycle" to correct (interference compensation) the "predictive controlled quantity (predictive value of the controlled quantity) of the action cycle after the second time".

Besides, the torque computing part 102 uses the action modelled internal model of the controlled object 30 and the servo driver 20 to compute the torque required for the predictive value (predictive value of the controlled quantity) corrected by the predictive value correcting part 106 to follow the command value (command position).

As shown in FIG. 6, in the "second action cycle" in which the interference compensation becomes effective, that is, in the "second action cycle" in which the predictive value correcting value 106 uses the "the model predictive error in the first action cycle" to correct the predictive controlled quantity (predictive value of the controlled quantity), the influence of the interference on the control is inhibited. For example, the position deviation in the "second action cycle" is different from that in the "first action cycle", and is almost moved by "0". Besides, the torque in the "second action cycle" is changed stably compared with the torque in the "first action cycle", and is not greatly fluctuated like that in "the first action cycle". That is, regarding shaping interference, the predictive value correcting value 106 corrects the predictive value in the action cycle of times after a predetermined time by using the model predictive error in the action cycle of the predetermined time (for example the first action cycle). Therefore, the controller 10 can reduce the influence of the interference on the control.

That is, in the controller 10, the predictive value correcting value 106 corrects the predictive value in the action cycle of times after a predetermined time by using the model predictive error in the action cycle of the predetermined time (for example the first action cycle) computed by the error computing part 104.

According to the structure, the predictive value correcting value 106 corrects the predictive value in the action cycle of times after a predetermined time by using the model predictive error in the action cycle of the predetermined time.

Herein, n is set into a natural number and is known in advance that the model predictive error in the nth action cycle is used to correct the predictive error of the times after the (n+1) time, then a user can prepare a surrounding with a high reproducibility for the motion control in the nth action cycle in advance. That is, the controller 10 can obtain the model predictive error suitable for correcting the predictive value in the action cycle of times after the (n+1) time in the nth action cycle.

Therefore, the controller 10 achieves the following effect of correcting the predictive value in the action cycle of times after the predetermined time by using the high-precision model predictive error in the action cycle of the predetermined time without including the error generated by accident.

Therefore, the controller 10 achieves the following effect of prestoring the model predictive error in the surrounding with the high reproducibility at the last of an adjusting stage prior to the present operation and correcting the predictive value during the present operation by using the stored model predictive error.

(Compensation of Changed Interference)

Under the condition that the interference is gradually changed, preferably, the controller 10 stores the reference predictive error every time and uses the reference predictive error stored in the preceding cycle to correct the prediction. Herein, the so-called "condition that the interference is gradually changed", for example, for the generated (applied) interference, there is the interference of the following trend. That is, for the interference applied in the nth control cycle, and the interference applied in the (n+1) control cycle, the applied timing and sizes are similar, for the interference applied in the (n+1)th control cycle and the interference applied in the (n+2)th control cycle, the applied timing and sizes are similar. However, for the interference applied in the nth control cycle and the interference applied in the (n+2)th control cycle, the applied timing and sizes are not considered to be similar, and the condition having such trend is called as "the condition that the interference is gradually changed".

Figure 7:
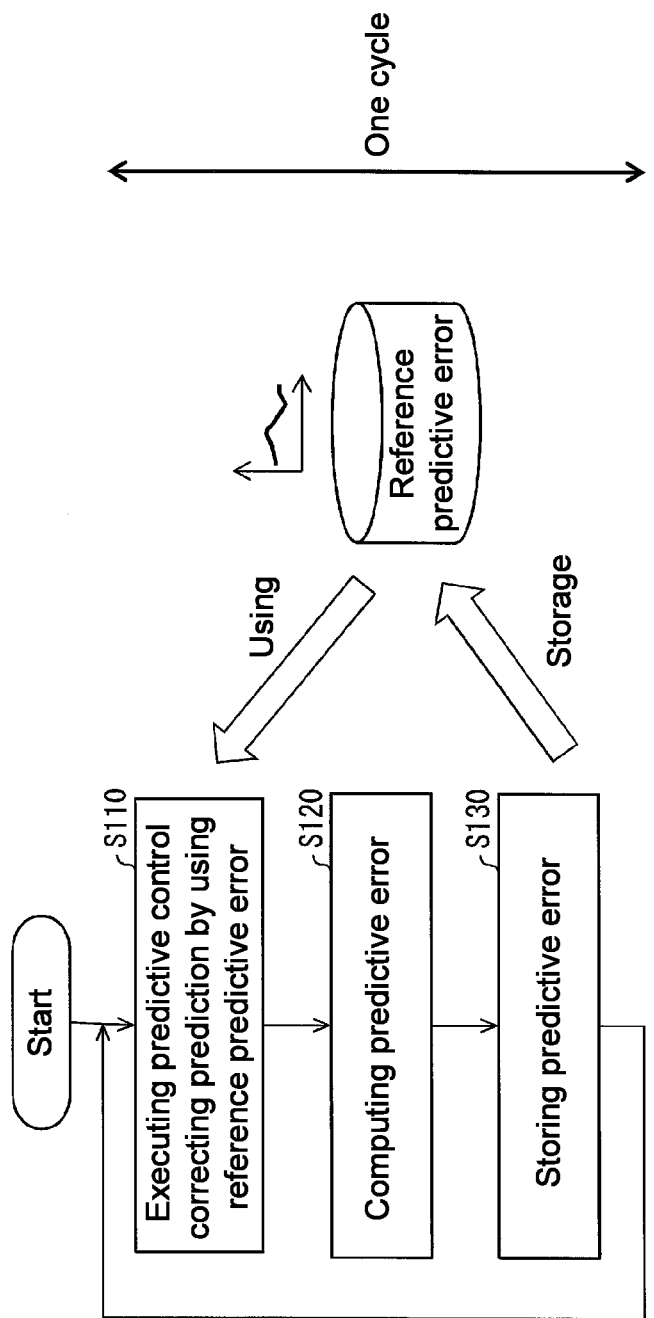
FIG. 7 is a flow chart illustrating an example of interference compensation processing executed by the controller of FIG. 1 and different from that of FIG. 4.

FIG. 7 is a flow chart illustrating an example of interference compensation processing executed by the controller 10 and different from that of FIG. 4. In the interference compensation processing as shown in FIG. 4, the error computing part 104 merely computes the model predictive error in the action cycle of such time specific to the "time designated by the user", and the predictive value correcting part 106 uses the model predictive error in the action cycle of the "time designated by the user" to correct the predictive value (predictive value of the controlled quantity, that is, predictive controlled quantity) in the action cycle of the times after the "time designated by the user".

Relatively, in the interference compensation processing as shown in FIG. 7, the error computing part 104 computes the model predictive error in each action cycle. That is, the error computing part 104 computes the model predictive error in each action cycle. Besides, the predictive value correcting part 106 uses the computed model predictive error to correct the predictive value (predictive value of the controlled quantity, i.e., the predictive controlled quantity) in the action cycle of the next time.

That is, as shown in FIG. 7, the controller 10 (torque computing part 102) executes the predictive control of the nth cycle of motion control (S110), at the same time, the error computing part 104 computes the predictive error data of one cycle (S120), and stores the computed model predictive error as error data 151 into the memory part 105 (S130). Details are explained as follows.

The torque computing part 102 executes predictive control of the "nth cycle" (S110), besides, the error computing part 104 computes the model predictive error in the "nth cycle" according to the actually measured value of the controlled quantity of the controlled object 30 in the "nth cycle" and the predictive controlled quantity in the "nth cycle" (S120). The error computing part 104 stores the model predictive error (new reference predictive error) in the "nth cycle" as the error data 151 into the memory part 105 (S130).

In the "(n+1)th" control cycle, the predictive value correcting part 106 uses the model predictive error (reference predictive error) of the "nth cycle" stored as the error data 151 to correct the predictive controlled quantity (the predictive value in the action cycle of the (n+1)th cycle computed by the torque computing part 102 (predictive value of the controlled quantity)). Besides, the torque computing part 102 uses the internal model to compute the torque required by the predictive value (predictive value of the controlled quantity) corrected by the predictive value correcting part 106 to follow the command value (command position). The torque command part 103 stores the torque computed by the torque computing part 102 as command torque (operating quantity) into the servo driver 20 (S110, execution of predictive control).

In addition, similar as what is shown in FIG. 4, in the processing as shown in FIG. 7, during the first control execution (control execution when "n=1"), since the reference predictive error is not stored into the memory part 105, there is no error data 151, the predictive value cannot be corrected in fact even through the interference compensation processing is executed.

In the control cycle of "(n+1)th cycle", the error computing part 104 computes the model predictive error in the "(n+1)th cycle" according to the actually measured value of the controlled quantity of the controlled object 30 in the "(n+1)th cycle" and the predictive controlled quantity in the "(n+1)th cycle" (S120). The error computing part 104 stores the model predictive error (new reference predictive error) in the "(n+1)th cycle" as error data 151 into the memory part 105 (S120).

The processing (control method) executed by the controller 10 explained with reference to FIG. 7 contains: an error computing step (S120), computing a model predictive error, wherein the model predictive error is an error between an actually measured value of the controlled quantity in a certain action cycle when an interference with the approximately same size and applying timing is applied among continuous multiple action cycles and a controlled quantity predictive value using the model in the certain action cycle; and a predictive value correcting step (S110), correcting the predictive error in the action cycle after the certain action cycles by using the model predictive error in the certain action cycle computed by the error computing part.

The controller 10 stores predictive error every time as the reference predictive error for the interference that at least one of the size and applying (generating) timing is gradually changed, and uses the predictive error stored in the preceding cycle as the reference predictive error to correct the prediction.

That is, in the controller 10, the predictive value correcting part 106 uses the model predictive error in the certain cycle computed by the error computing part 104 to correct the predictive value in the action cycle next to the certain action cycle.

According to the structure, the predictive correcting part 106 uses the model predictive error in the certain cycle to correct the predictive value in the action cycle next to the certain action cycle.

Herein, when the error computing part 104 computes the model predictive error in the certain action cycle, it can be considered that a possibility that the same model predictive error occurs in the action cycle next to the certain action cycle is high.

Therefore, the controller 10 achieves the following effects of computing that the possibility of the model predictive error similar to that computed in the certain action cycle is high and correcting the predictive value in the action cycle next to the certain action cycle by using the model predictive error in the certain action cycle.

Figure 8:
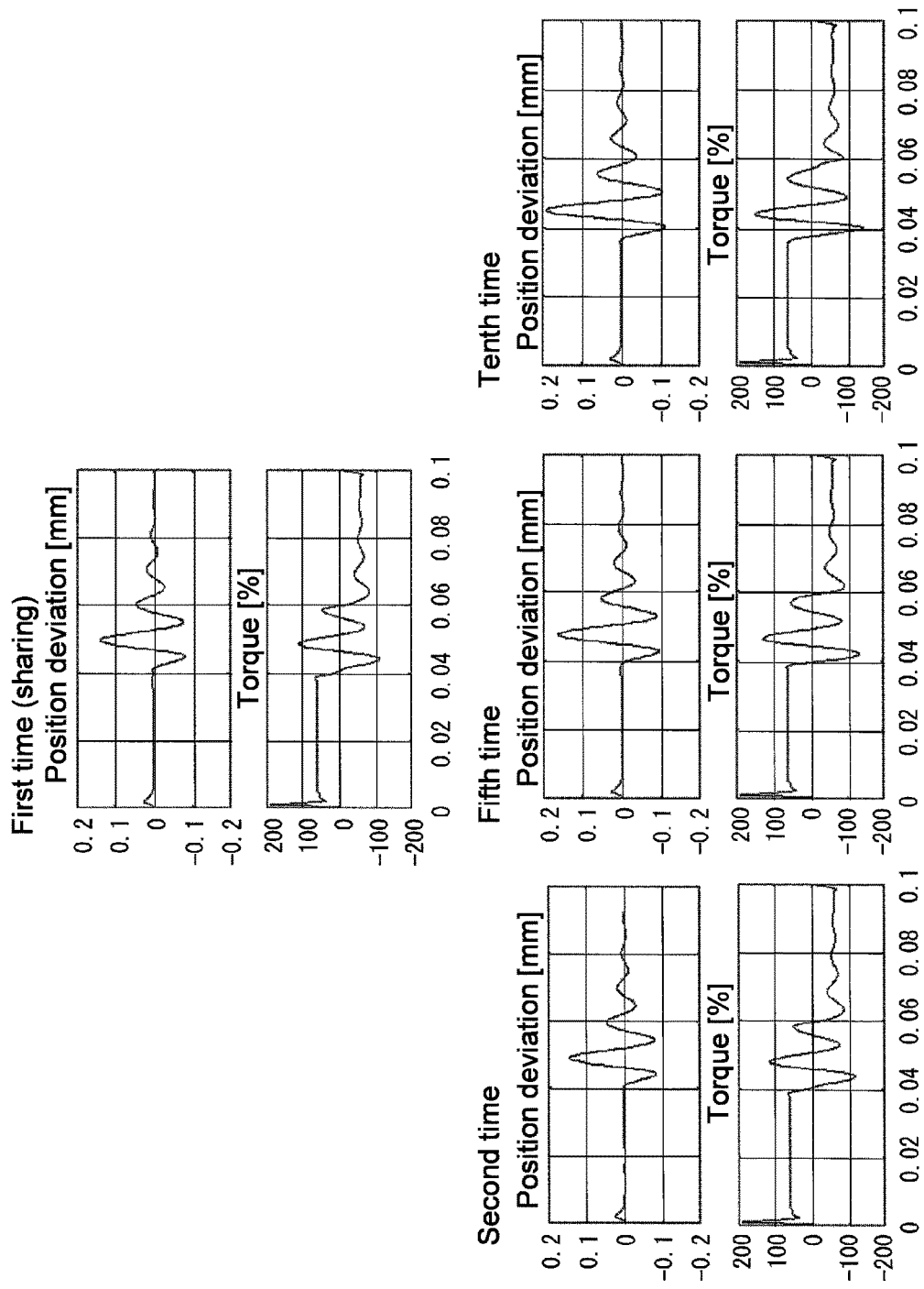
FIG. 8 is a diagram illustrating a trajectory of a position deviation and so on when the controller of FIG. 1 does not execute the interference compensation processing as shown in FIG. 7 when an applied interference is changed gradually.
Figure 9:
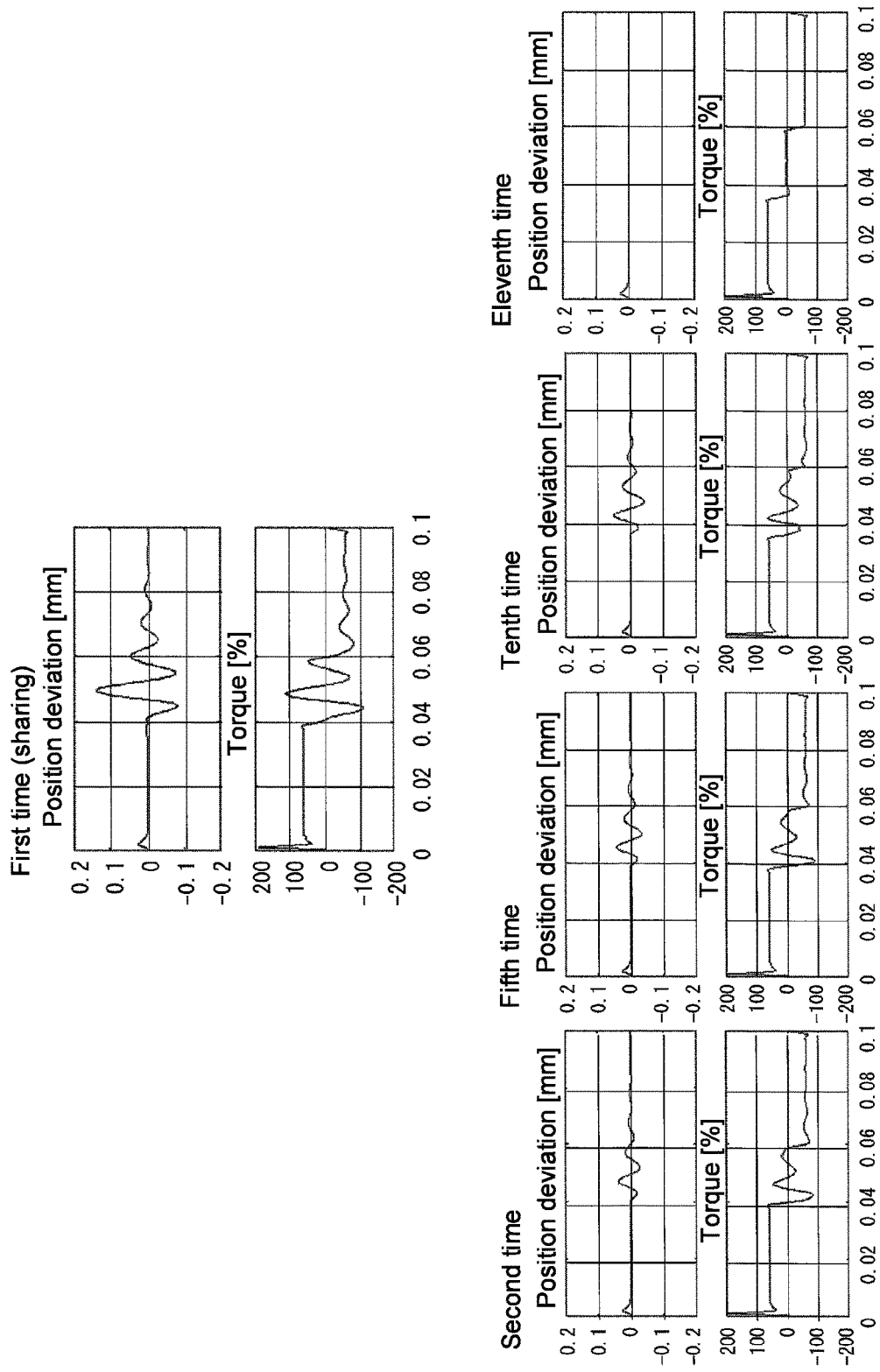
FIG. 9 is a diagram illustrating a trajectory of a position deviation and so on when the controller of FIG. 1 executes the interference compensation processing as shown in FIG. 7 when an applied interference is changed gradually.

The effect when the controller 10 executes the interference compensation processing as shown in FIG. 7 specific to the interference that at least one of the size and applying (generating) timing is gradually changed is explained with FIGS. 8 and 9. The examples as shown in FIGS. 8 and 9 are the same in the following aspects: both specific to the control of the target trajectory data (target trajectory) of "moving by 60 mm for 100 ms (one cycle)", the pulse torque interference with a pulse width of 4 ms and an amplitude of 50% is applied at moment 40 ms, in the second to tenth control cycle (cycle) of motion control, in each cycle, the interference applying moment is deviated forward by 0.5 ms, and the amplitude is increased by 2% time by time, and in the eleventh control cycle, the change of the interference is stopped, and the interference same as that in the tenth control cycle is given. In addition, FIG. 8 illustrates a trajectory of a position deviation and so on when the controller 10 does not execute the interference compensation processing as shown in FIG. 7 relatively, FIG. 9 illustrates a trajectory of a position deviation and so on when the controller 10 executes the interference compensation processing as shown in FIG. 7. Besides, in FIGS. 8 and 9, the position deviation and the torque trajectory of the first cycle are the same. This is because, as mentioned above, during primary control execution (during control execution when "n=1"), the reference predictive error is not stored in the memory part 105 yet, there is no error data 151, and the predictive value cannot be corrected in fact even through the interference compensation processing is executed.

FIG. 8 is a diagram illustrating a trajectory of a position deviation and so on when the controller 10 does not execute the interference compensation processing as shown in FIG. 7 when an applied interference is changed gradually. As shown in FIG. 8, when the controller 10 does not execute the interference compensation processing as shown in FIG. 7, the position deviation is expanded little by little.

FIG. 9 is a diagram illustrating a trajectory of a position deviation and so on when the controller 10 executes the interference compensation processing as shown in FIG. 7 when an applied interference is changed gradually. In the example as shown in FIG. 9, what is in sharp contrast with the trajectory of the position deviation as shown in FIG. 8 is that even though the applied interference is changed, the controller 10 can also inhibit expansion of the position deviation, and when the change of the applied interference is stopped, the controller 10 almost totally inhibits the expansion of the position deviation.

(Example of a Display Picture)

Figure 10:
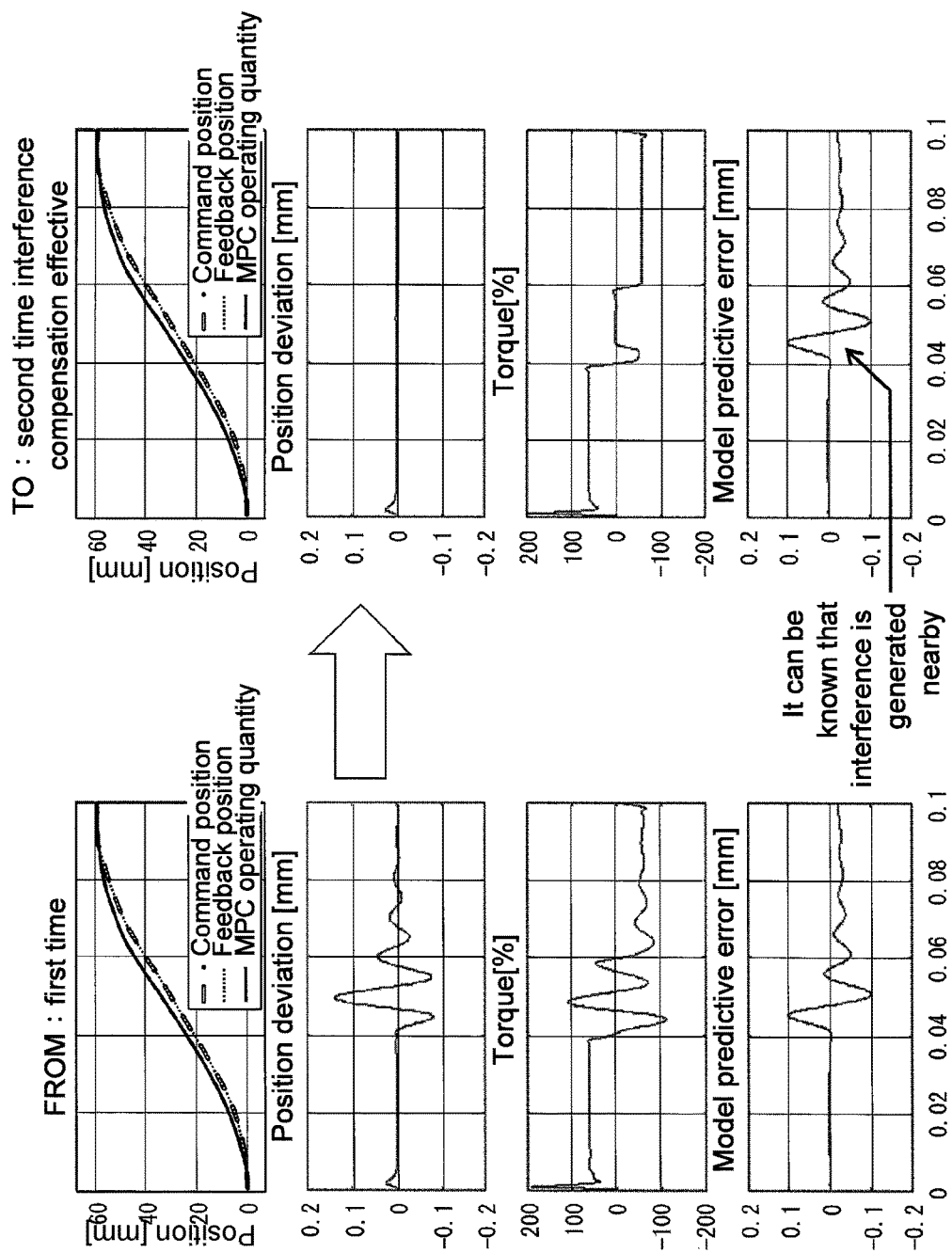
FIG. 10 is a diagram for illustrating an example of a trend graph of a predictive error displayed by the controller in FIG. 1.

FIG. 10 a diagram for illustrating an example of a trend graph (a diagram expressing time change) of a predictive error displayed by the controller 10. As shown in FIG. 10, a display control part 108 of the controller 10 displays a time change of the model predictive error (the error data 151 computed by the error computing part 104 and stored into the memory part 105) to a user.

According to the structure, the display control part 108 displays the time change of the model predictive error to the user. Therefore, the controller 10 achieves the following effect that since the time change of the model predictive error is displayed to the user, the user can approximately master an interference according to a waveform occurring in the time change (so-called trend graph) of the model predictive error displayed by the controller 10.

The display control part 108 displays a trend graph of the predictive error (model predictive error), such that the user can confirm that the interference is generated at which time point in one cycle (action cycle). Particularly, when the interference compensation is functioned effectively, the user difficultly confirms a form of the generated interference only depending on control over fluctuation of the deviation. But according to the trend graph of the predictive error displayed by the display control part 108, the user can easily confirm a generating time point (moment) of the interference.

Embodiment 2

Figure 11:
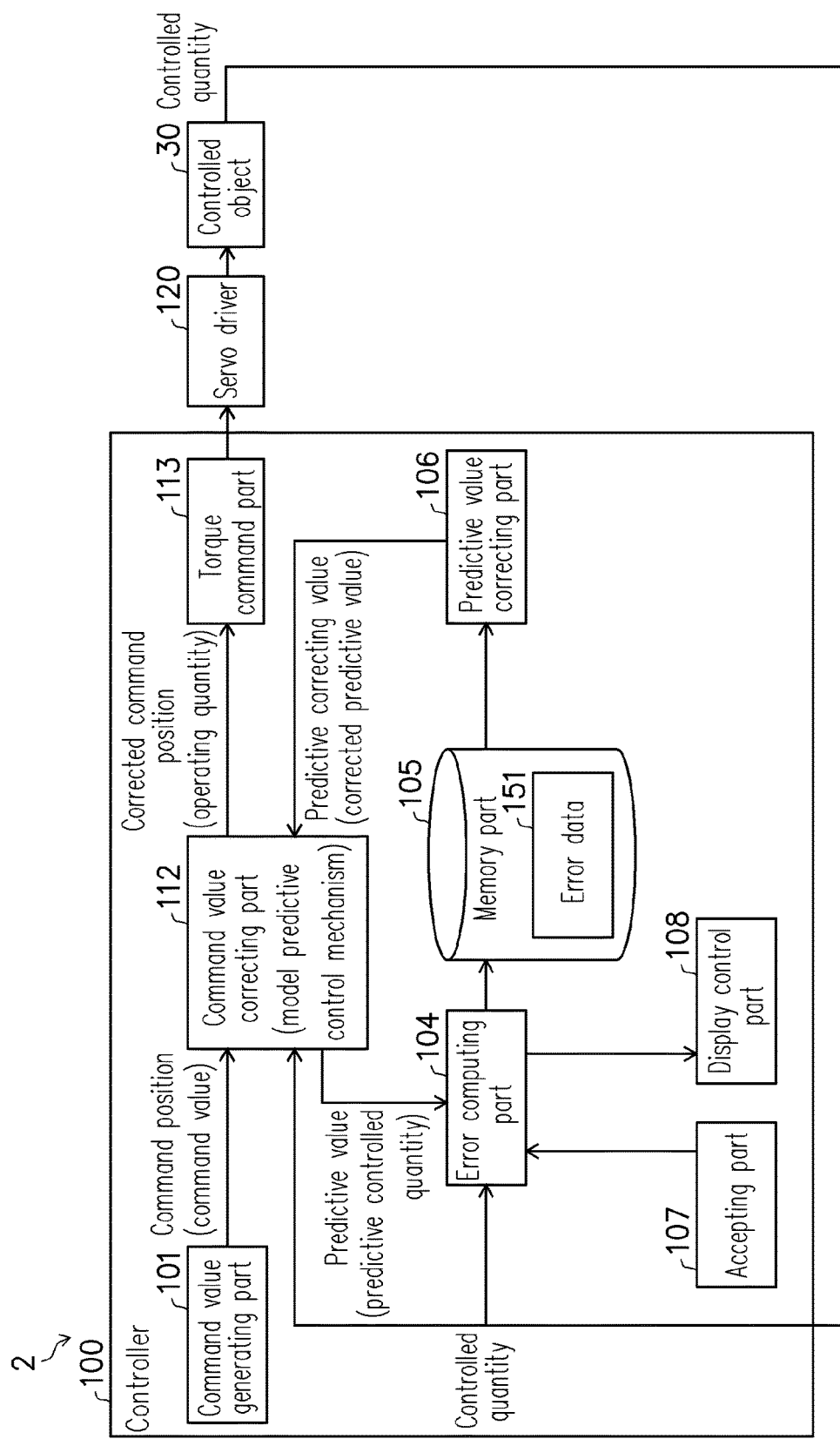
FIG. 11 is a block diagram of a main part structure of a controller of an embodiment 2 of the present invention.
Figure 12:
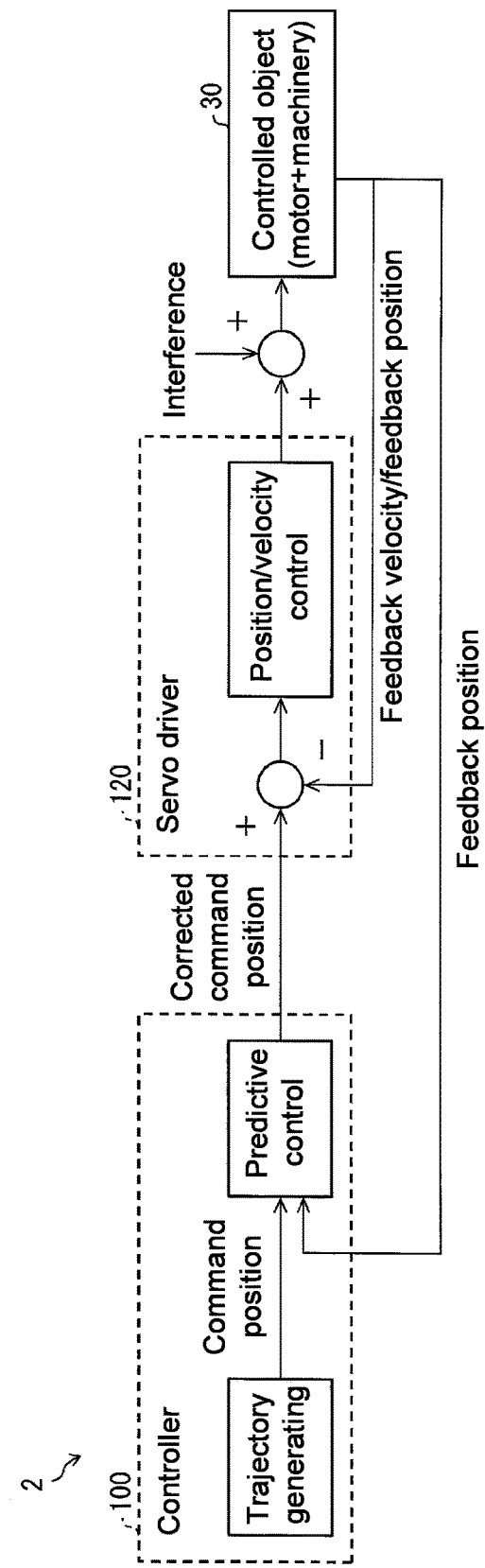
FIG. 12 is a diagram illustrating a summary of a control system containing the controller in FIG. 11.

Another embodiment of the present invention is explained based on FIGS. 11 and 12. In addition, in order to ensure compactness in recording, only the structures (processing process and processed content) different from embodiment 1 are explained. That is, the structures recorded in embodiment 1 can all be contained in the present embodiment. Besides, the meanings of terms recorded in embodiment 1 also the same as those in embodiment 2.

(Summary of a Control System)

FIG. 12 is a diagram illustrating a summary of a control system 2 containing a controller 100. The control system 2 is different from the control system 1 that executes position/velocity control and outputs the torque command value through predictive control to the servo driver 20 through the controller 10, the controller 100 corrects a command position for a servo driver 120 through predictive control and the servo driver 120 executes position/velocity control. That is, in the control system 1, the controller 10 outputs the torque command value to the servo driver 20, relatively, in the control system 2, the controller 100 output the command position to the servo driver 120.

The controller 100 is a controller having a model predictive control mechanism and outputs the command position as an operating quantity to the servo driver 120. The controller 100 for example accepts target trajectory data (target trajectory) from outside such as a user (trajectory generation), and generates a command value (command position) in each control cycle according to the accepted target trajectory data. Besides, the controller 100 obtains "output, i.e., controlled quantity (predictive value of the controlled quantity) of the controlled object 30" from the controlled object 30 as feedback information. That is, the controller 100 obtains the position output from the controlled object 30 as a feedback position.

Herein, the controller 100 has a model of the controlled object 30 and the servo driver 120 as an internal model and, and by using the internal model, outputs the command position as the operating quantity to the servo driver 120 based on the generated position command and "the output, that is, the feedback position (actually measured value of the controlled quantity) of the controlled object 30".

In the control system 1, for the characteristic of the torque control part of the servo driver 20, it can also be considered that "input and output are approximately the same", such that the model of the servo model 20 is omitted. That is, the internal model used by the controller 10 can also be only the model of the controlled object 30.

In other aspect, in the control system 2, since the servo driver 20 executes position control and velocity control, the model of the servo driver 120 and the controlled object 30 are equally important, and are necessary. That is, the internal model used by the controller 100 is the models of the servo model 120 and the controlled object 30. The controller 100 needs models of both the servo model 120 and the controlled object 30 as the internal models. The controller 100 can also independently has respective models of the servo model 120 and the controlled object 30. However, when controller 100 executes model predictive control, the controller 100 needs to the model with the characteristics of the whole of the controlled object (the servo model 120 and the controlled object 30) integrating the servo model 120 and the controlled object 30.

The controller 100 predicts the controlled quantity output by the controlled object 30 by using the internal model, and infers a predictive error for interference compensation, that is, uses the prestored model predictive error to correct the predicted controlled quantity (predictive value). Besides, the controller 100 uses the predictive value, i.e., the predictive corrected value (corrected predictive value) that is connected by using the model predictive error to compute the corrected command position (operating quantity) output to the servo driver 120.

The servo driver 120 performs position/velocity control over the controlled object 30. That is, the servo driver 120 obtains the command position (corrected command position) from the controller 100. Besides, the servo driver 120 obtains the "output, i.e., the controlled quantity (actually measured value of the controlled quantity) of the controlled object 30" from the controlled object 30 as feedback information. That is, the servo driver 120 obtains the velocity and position (at least one of the velocity and position) output from the controlled object 30 as a feedback velocity and a feedback position (at least one of the feedback velocity and the feedback position).

The servo driver 120 uses the command position (corrected command position) obtained from the controller 100 and at least one of the feedback velocity and feedback position obtained from the controlled object 30 to execute position/velocity control over the controlled object 30.

(Summary of the Controller)

As so far, FIG. 12 is used to explain the controller 100 contained in the control system 2, and then the structure and processed content are explained with FIG. 11. Before detailed content is explained by referring to FIG. 11, the summary is cleared up as follows to conveniently understand the controller 100.

The controller 100 (model predictive control device) is the model predictive control device as mentioned below, that is, predicts the controlled quantity of the controlled object 30 corresponding to the command value by using a model of the whole of the controlled object (the servo driver 120 and the controlled object 30) as the motion controlled object. The controller 100, like the controller 10 in the control system 1, has an error computing part 104 and a predictive value correcting part 106.

The controller 100 further comprises a command value correcting part 112, correcting the command value in a manner that the predictive value corrected by the predictive value correcting part 106 follows the command value; and a position command part 113, outputting the command value corrected by the command value correcting part 112, i.e., a corrected command value as a command value related to position control of the controlled object 30 to the servo driver 120 (control system performing motion control over the controlled object 30).

According to the structure, the command value correcting part 112 corrects the command value in a manner that the predictive value corrected by the predictive value correcting part 106 follows the command value; and the position command part 113 outputs the command value corrected by the command value correcting part 112, i.e., a corrected command value as a command value related to position control of the controlled object 30 to the servo driver 120.

Therefore, the controller 100 achieves the following effect of being capable of outputting the command value corrected in a manner that the controlled quantity of the controlled object 30 follows the command value to the servo driver 120 without a need to execute an operation processing of converting the change of the controlled quantity caused by the interference into the operating quantity.

(Details of the Controller)

For the controller 100 of which the summary is explained, its detailed structure is explained by using FIG. 11.

FIG. 11 is a block diagram of a main part structure of a controller 100 of the embodiment 2 of the present invention. The controller 100 as shown in FIG. 11 has a command value correcting part 112 and a position command part 113 instead of the torque computing part 102 and torque command part 103 of the controller 10 as shown in FIG. 1. Regarding the structures except for the torque computing part 102 and torque command part 103 of the controller 100, since the structures are same as the structures expect for the torque computing part 102 and torque command part 103 of the controller 10, its detailed recording is omitted.

The command value correcting part 112 executes model predictive control, specifically, an internal model of the controlled object (that is, the servo driver 120 and the controlled object 30) is used to predict a future state, to decide (infers) an operating quantity (command position) in a manner of controlling the future output (predictive value of the controlled quantity) of the controlled object 30 to approach to a target value (command value, that is the command position) as much as possible. That is, the command value correcting part 112 predicts a change of the future output (controlled quantity) based on the internal model, so as to decide the input (operating quantity, i.e., the command position) in a manner that the output is approached to the target value as much as possible.

The command value correcting part 112 contains the internal model for modelling actions of the controlled object (the servo driver 120 and the controlled object 30), and uses the internal model to predict a controlled quantity output by the controlled object 30 in each control cycle. That is, the command value correcting part 112 uses the internal model to compute the predictive value in each control cycle (predictive value of the controlled quantity). The torque computing part 112 notifies the computing part 104 of the computed predictive value (predictive controlled quantity).

Besides, the command value correcting part 112 uses the internal model to compute an operating quantity (corrected command position) required by the predictive corrected value (corrected predictive value) obtained from the predictive value correcting part 106, that is, the predictive value (predictive value of the controlled quantity) corrected by the predictive value correcting part 106 to follow the command value (command position). The command value correcting part 112 notifies the position command part 113 of the computed corrected command position as the operating quantity.

The position command part 113 uses the corrected command position (operating quantity) notified from the command value correcting part 112 as a command value related to the position/velocity control of the controlled object 30 and outputs to the servo driver 120 (control system performing motion control over the controlled object 30).

(Implementing Examples by Means of Software)

Control blocks (particularly, the command value generating part 101, the torque computing part 102, the torque command part 103, the error computing part 104, the memory part 105, the predictive value correcting part 106, the accepting part 107, the display control part 108, the command value correcting part 112 and the position command part 113) of the controller 10 and the controller 100 can be realized by a logic circuit (hardware) formed on an IC chip and can also be realized by software by using a Central Processing Unit (CPU).

Under the latter condition, the controller 10 and the controller 100 have a CPU executing a command to realize software, i.e., program of various functions; a Read Only Memory (ROM) or storage device (they are called as "recording medium"), recording the program and various data in a computer (or CPU) readable manner; and a Random Access Memory (RAM) expanding the program. Besides, the objective of the present invention is finished by reading the program from the recording medium and executing the program through the computer (CPU). As the recording medium, "a non-temporary physical medium", for example, a tape, a disk, a card, a semiconductor memory, a programmable logic circuit, etc., can be used. Besides, the program can be provided to the computer through any transfer medium (communication network or radio waves) capable of transmitting the program. In addition, the present invention can be realized by embodying the program through electronic transfer in a form of a data signal embedded into carriers.

The present invention is not limited to each embodiment, and can be changed in many ways in the scope shown by claims, and the embodiments obtained by properly combining the technical means respectively disclosed in different embodiments also fall within a technical scope of the present invention.

What is claimed is:

1. A model predictive control device comprising a processor, configured to:
use a model of a controlled object as a motion controlled object to predict a controlled quantity of the controlled object corresponding to a command value;
compute a model predictive error, wherein the model predictive error is an error between a measured value of the controlled quantity of the controlled object in a certain action cycle among continuous multiple action cycles when an amount and a timing of an interference subjected to each of the continuous multiple action cycles are the same and a controlled quantity predictive value using the model in the certain action cycle;
correct the predictive value in the action cycle after the certain action cycle by using the model predictive error in the certain action cycle;
compute a torque required by the corrected predictive value to follow the command value;
output the computed torque as a command value related to torque control of the controlled object to a control system performing motion control over the controlled object;
correct the command value such that the predictive value follows the command value; and
output the command value, a corrected command value as a command value related to position control of the controlled object, to the control system performing motion control over the controlled object.

2. The model predictive control device according to claim 1, characterized in that
the processor corrects the predictive value in the action cycle of times after a predetermined time by using the model predictive error in the action cycle of the predetermined time.

3. The model predictive control device according to claim 1, characterized in that
the processor corrects the predictive value in the action cycle next to a certain action cycle by using the model predictive error in the certain action cycle.

4. The model predictive control device according to claim 1, characterized in that the processor is further configured to:
accept user operation, wherein the user operation is to select for setting the model predictive error to be the model predictive error in which action cycle.

5. The model predictive control device according to claim 1, characterized in that the processor is further configured to:
display a time change of the model predictive error to a user.

6. A control method of a model predictive control device, wherein the control method comprises:
a predicting step, using a model of a controlled object as a motion controlled object to predict a controlled quantity of the controlled object corresponding to a command value;
an error computing step, computing a model predictive error, wherein the model predictive error is an error between a measured value of the controlled quantity of the controlled object in a certain action cycle among continuous multiple action cycles when an amount and a timing of an interference subjected to each of the continuous multiple action cycles are the same and a controlled quantity predictive value using the model in the certain action cycle;
a predictive value correcting step, correcting the predictive error in the action cycle after the certain action cycle by using the model predictive error in the certain action cycle computed by the error computing step;
a torque computing step, computing a torque required by the corrected predictive value to follow the command value;
a torque command step, outputting the computed torque as a command value related to torque control of the controlled object to a control system performing motion control over the controlled object;
a command value correcting step, correcting the command value such that the predictive value follows the command value; and
a position command step, outputting the command value, a corrected command value as a command value related to position control of the controlled object, to the control system performing motion control over the controlled object.

7. An information processing program, for causing a computer to:
use a model of a controlled object as a motion controlled object to predict a controlled quantity of the controlled object corresponding to a command value;
compute a model predictive error, wherein the model predictive error is an error between a measured value of the controlled quantity of the controlled object in a certain action cycle among continuous multiple action cycles when an amount and a timing of an interference subjected to each of the continuous multiple action cycles are the same and a controlled quantity predictive value using the model in the certain action cycle;
correct the predictive value in the action cycle after the certain action cycle by using the model predictive error in the certain action cycle;
compute a torque required by the corrected predictive value to follow the command value;
output the computed torque as a command value related to torque control of the controlled object to a control system performing motion control over the controlled object;
correct the command value such that the predictive value follows the command value; and
output the command value, a corrected command value as a command value related to position control of the controlled object, to the control system performing motion control over the controlled object.

8. A non-transitory computer-readable recording medium, recording an information processing program to cause a computer to:
use a model of a controlled object as a motion controlled object to predict a controlled quantity of the controlled object corresponding to a command value;
compute a model predictive error, wherein the model predictive error is an error between a measured value of the controlled quantity of the controlled object in a certain action cycle among continuous multiple action cycles when an amount and a timing of an interference subjected to each of the continuous multiple action cycles are the same and a controlled quantity predictive value using the model in the certain action cycle;
correct the predictive value in the action cycle after the certain action cycle by using the model predictive error in the certain action cycle;

compute a torque required by the corrected predictive value to follow the command value;
output the computed torque as a command value related to torque control of the controlled object to a control system performing motion control over the controlled object;
correct the command value such that the predictive value follows the command value; and
output the command value, a corrected command value as a command value related to position control of the controlled object, to the control system performing motion control over the controlled object.

9. A model predictive control device, comprising:
a predicting logic circuit, using a model of a controlled object as a motion controlled object to predict a controlled quantity of the controlled object corresponding to a command value;
an error computing logic circuit, computing a model predictive error, wherein the model predictive error is an error between a measured value of the controlled quantity of the controlled object in a certain action cycle among continuous multiple action cycles when an amount and a timing of an interference subjected to each of the continuous multiple action cycles are the same and a controlled quantity predictive value using the model in the certain action cycle;
a predictive value correcting logic circuit, correcting the predictive value in the action cycle after the certain action cycle by using the model predictive error in the certain action cycle computed by the error computing circuit;
a torque computing logic circuit, computing a torque required by the corrected predictive value to follow the command value;
a torque command logic circuit, outputting the computed torque as a command value related to torque control of the controlled object to a control system performing motion control over the controlled object;
a command value correcting circuit, correcting the command value such that the predictive value follows the command value; and
a position command logic circuit, outputting the command value, a corrected command value as a command value related to position control of the controlled object, to the control system performing motion control over the controlled object.

* * * * *